(12) United States Patent
Kim et al.

(10) Patent No.: US 12,525,163 B2
(45) Date of Patent: Jan. 13, 2026

US012525163B2

(54) PIXEL CIRCUIT AND DISPLAY APPARATUS INCLUDING THE SAME

(71) Applicant: Samsung Display Co., LTD., Yongin-si (KR)

(72) Inventors: Yeonkyung Kim, Yongin-si (KR); Kwihyun Kim, Yongin-si (KR); Dongwoo Kim, Yongin-si (KR)

(73) Assignee: Samsung Display Co., LTD., Gyeonggi-do (KR)

( * ) Notice: Subject to any disclaimer, the term of this patent is extended or adjusted under 35 U.S.C. 154(b) by 0 days.

(21) Appl. No.: 18/616,442

(22) Filed: Mar. 26, 2024

(65) Prior Publication Data

US 2024/0331602 A1 Oct. 3, 2024

(30) Foreign Application Priority Data

Mar. 28, 2023 (KR) ........................ 10-2023-0040475

(51) Int. Cl.
*G09G 3/20* (2006.01)

(52) U.S. Cl.
CPC ....... *G09G 3/20* (2013.01); *G09G 2300/0819* (2013.01); *G09G 2300/0852* (2013.01); *G09G 2300/0861* (2013.01); *G09G 2310/0275* (2013.01); *G09G 2310/0297* (2013.01); *G09G 2310/08* (2013.01)

(58) Field of Classification Search
None
See application file for complete search history.

(56) References Cited

U.S. PATENT DOCUMENTS

| | | | | |
|---|---|---|---|---|
| 8,842,058 B2 * | 9/2014 | Kwak | G09G 3/3233 349/39 |
| 10,902,795 B2 * | 1/2021 | Park | G09G 3/3291 |
| 10,957,249 B2 * | 3/2021 | Lee | G09G 3/3233 |
| 11,997,899 B2 * | 5/2024 | Zheng | G09G 3/3291 |
| 2014/0111563 A1 * | 4/2014 | Hwang | G09G 3/003 345/691 |

(Continued)

FOREIGN PATENT DOCUMENTS

| | | |
|---|---|---|
| CN | 108492770 | 9/2018 |
| CN | 113724654 | 11/2021 |
| KR | 10-0914929 | 9/2009 |

*Primary Examiner* — Patrick N Edouard
*Assistant Examiner* — Peijie Shen
(74) *Attorney, Agent, or Firm* — HARNESS, DICKEY & PIERCE, P.L.C.

(57) ABSTRACT

A pixel circuit includes a first transistor connected to a gate node, receiving a first power voltage, and connected to a second node, a second transistor receiving a data writing gate signal, receiving a data voltage, and connected to a first node, a third transistor receiving a compensation gate signal, connected to the gate node, and connected to the second node, a fourth transistor receiving an initialization gate signal, receiving an initialization voltage, and connected to the gate node, a fifth transistor receiving the initialization gate signal, connected to the first node, and connected to an anode node, a sixth transistor receiving an emission signal, connected to the second node, and connected to the anode node, and a light emitting element connected to the anode node and receiving a second power voltage.

22 Claims, 15 Drawing Sheets

(56) References Cited

U.S. PATENT DOCUMENTS

| | | | | |
|---|---|---|---|---|
| 2016/0155383 | A1* | 6/2016 | Chen | G09G 3/3258 345/78 |
| 2017/0301289 | A1* | 10/2017 | Jeong | G09G 3/3233 |
| 2019/0096327 | A1* | 3/2019 | Peng | G09G 3/3241 |
| 2019/0304364 | A1 | 10/2019 | Xiao et al. | |
| 2021/0027696 | A1* | 1/2021 | Kim | G09G 3/3233 |
| 2021/0125559 | A1* | 4/2021 | Park | H10K 59/1213 |
| 2022/0199022 | A1* | 6/2022 | Huangfu | G09G 3/3233 |
| 2022/0208929 | A1* | 6/2022 | Min | H10D 86/423 |
| 2023/0042966 | A1* | 2/2023 | Huangfu | G09G 3/3258 |
| 2023/0052846 | A1* | 2/2023 | Zheng | H10K 59/1213 |
| 2023/0225160 | A1* | 7/2023 | Cho | G09G 3/3233 345/694 |
| 2023/0306905 | A1* | 9/2023 | Park | G09G 3/3233 |
| 2024/0212584 | A1* | 6/2024 | Kim | G09G 3/3233 |
| 2024/0242671 | A1* | 7/2024 | Kim | G09G 3/3233 |
| 2024/0346972 | A1* | 10/2024 | Kim | G09G 3/3233 |

* cited by examiner

PIXEL CIRCUIT AND DISPLAY APPARATUS INCLUDING THE SAME

CROSS REFERENCE TO RELATED APPLICATION(S)

This application claims priority to and benefits of Korean Patent Application No. 10-2023-0040475 under 35 U.S.C. § 119, filed on Mar. 28, 2023 in the Korean Intellectual Property Office (KIPO), the contents of which are incorporated herein by reference in their entireties.

BACKGROUND

1. Technical Field

Embodiments of the present disclosure relate to a pixel circuit and a display apparatus including the pixel circuit. More particularly, embodiments of the present disclosure relate to a pixel circuit including fewer transistors, and thus, applicable to an ultra-high resolution display apparatus and a display apparatus including the pixel circuit.

2. Description of the Related Art

Generally, a display apparatus includes a display panel and a display panel driver. The display panel includes gate lines, data lines, emission lines and pixels. The display panel driver includes a gate driver, a data driver, an emission driver and a driving controller. The gate driver outputs gate signals to the gate lines. The data driver outputs data voltages to the data lines. The emission driver outputs emission signals to the emission lines. The driving controller controls the gate driver, the data driver and the emission driver.

A conventional pixel circuit may include seven or more transistors, and thus, the pixel circuit may not be applied to an ultra-high resolution display apparatus due to a limitation in integration.

SUMMARY

Embodiments of the present disclosure provide a pixel circuit including fewer transistors, and thus, applicable to an ultra-high resolution display apparatus.

Embodiments of the present disclosure also provide a display apparatus including the pixel circuit.

In an embodiment of a pixel circuit according to the present disclosure, the pixel circuit includes a first transistor, a second transistor, a third transistor, a fourth transistor, a fifth transistor, a sixth transistor and a light emitting element. The first transistor includes a control electrode electrically connected to a gate node, a first electrode that receives a first power voltage, and a second electrode electrically connected to a second node. The second transistor includes a control electrode that receives a data writing gate signal, a first electrode that receives a data voltage, and a second electrode electrically connected to a first node. The third transistor includes a control electrode that receives a compensation gate signal, a first electrode electrically connected to the gate node, and a second electrode electrically connected to the second node. The fourth transistor includes a control electrode that receives an initialization gate signal, a first electrode that receives an initialization voltage, and a second electrode electrically connected to the gate node. The fifth transistor includes a control electrode that receives the initialization gate signal, a first electrode electrically connected to the first node, and a second electrode electrically connected to an anode node. The sixth transistor includes a control electrode that receives an emission signal, a first electrode electrically connected to the second node, and a second electrode electrically connected to the anode node. The light emitting element includes a first electrode electrically connected to the anode node, and a second electrode that receives a second power voltage.

In an embodiment, the pixel circuit may further include a first capacitor including a first end that receives the first power voltage, and a second end electrically connected to the gate node; and a second capacitor including a first end electrically connected to the first node, and a second end electrically connected to the gate node.

In an embodiment, in a first period, the emission signal may have an active level, the initialization gate signal may have an active level, the compensation gate signal may have an active level, and the data writing gate signal may have an inactive level.

In an embodiment, in a second period subsequent to the first period, the emission signal may have the inactive level, the initialization gate signal may have an inactive level, the compensation gate signal may have the active level, and the data writing gate signal may have the inactive level.

In an embodiment, in a third period subsequent to the second period, the emission signal may have the inactive level, the initialization gate signal may have the inactive level, the compensation gate signal may have an inactive level, and the data writing gate signal may have an active level.

In an embodiment, in a fourth period subsequent to the third period, the emission signal may have the active level, the initialization gate signal may have the inactive level, the compensation gate signal may have the inactive level, and the data writing gate signal may have the inactive level.

In an embodiment, in a first period, the emission signal may have an inactive level, the data writing gate signal may have an active level, the initialization gate signal may have an active level, and the compensation gate signal may have an inactive level.

In an embodiment, in a second period subsequent to the first period, the emission signal may have the inactive level, the data writing gate signal may have the active level, the initialization gate signal may have an inactive level, and the compensation gate signal may have an active level.

In an embodiment, in a third period subsequent to the second period, the emission signal may have the inactive level, the data writing gate signal may have the active level, the initialization gate signal may have the inactive level, and the compensation gate signal may have the inactive level.

In an embodiment, in a fourth period subsequent to the third period, the emission signal may have an active level, the data writing gate signal may have an inactive level, the initialization gate signal may have the inactive level, and the compensation gate signal may have the inactive level.

In an embodiment, the compensation gate signal of an n-th stage may be the initialization gate signal of an (n+1)-th stage. n is a positive integer.

In an embodiment, in a first period, the emission signal may have an active level, the data writing gate signal may have an active level, the initialization gate signal may have an active level, and the compensation gate signal may have an active level.

In an embodiment, in a second period subsequent to the first period, the emission signal may have an inactive level, the data writing gate signal may have the active level, the initialization gate signal may have an inactive level, and the compensation gate signal may have the active level.

In an embodiment, in a third period subsequent to the second period, the emission signal may have the inactive level, the data writing gate signal may have the active level, the initialization gate signal may have the inactive level, and the compensation gate signal may have an inactive level.

In an embodiment, in a fourth period subsequent to the third period, the emission signal may have the active level, the data writing gate signal may have an inactive level, the initialization gate signal may have the inactive level, and the compensation gate signal may have the inactive level.

In an embodiment of a display apparatus according to the present disclosure, the display apparatus includes a display panel, a gate driver, a data driver, and an emission driver. The display panel includes a pixel circuit. The gate driver is configured to output a gate signal to the pixel circuit. The data driver is configured to output a data voltage to the pixel circuit. The emission driver is configured to output an emission signal to the pixel circuit. The pixel circuit includes a first transistor, a second transistor, a third transistor, a fourth transistor, a fifth transistor, a sixth transistor and a light emitting element. The first transistor includes a control electrode electrically connected to a gate node, a first electrode that receives a first power voltage, and a second electrode electrically connected to a second node. The second transistor includes a control electrode that receives a data writing gate signal, a first electrode that receives a data voltage, and a second electrode electrically connected to a first node. The third transistor includes a control electrode that receives a compensation gate signal, a first electrode electrically connected to the gate node, and a second electrode electrically connected to the second node. The fourth transistor includes a control electrode that receives an initialization gate signal, a first electrode that receives an initialization voltage, and a second electrode electrically connected to the gate node. The fifth transistor includes a control electrode that receives the initialization gate signal, a first electrode electrically connected to the first node, and a second electrode electrically connected to an anode node. The sixth transistor includes a control electrode configured to receive an emission signal, a first electrode electrically connected to the second node, and a second electrode electrically connected to the anode node. The light emitting element includes a first electrode electrically connected to the anode node, and a second electrode that receives a second power voltage.

In an embodiment, the pixel circuit may further include a first capacitor including a first end that receives the first power voltage, and a second end electrically connected to the gate node; and a second capacitor including a first end electrically connected to the first node, and a second end electrically connected to the gate node.

In an embodiment, in a first period, the emission signal may have an active level, the initialization gate signal may have an active level, the compensation gate signal may have an active level, and the data writing gate signal may have an inactive level.

In an embodiment, in a second period subsequent to the first period, the emission signal may have the inactive level, the initialization gate signal may have an inactive level, the compensation gate signal may have the active level, and the data writing gate signal may have the inactive level.

In an embodiment, in a third period subsequent to the second period, the emission signal may have the inactive level, the initialization gate signal may have the inactive level, the compensation gate signal may have an inactive level, and the data writing gate signal may have an active level.

In an embodiment, in a fourth period subsequent to the third period, the emission signal may have the active level, the initialization gate signal may have the inactive level, the compensation gate signal may have the inactive level, and the data writing gate signal may have the inactive level.

In an embodiment, the compensation gate signal of an n-th stage may be the initialization gate signal of an (n+1)-th stage. n is a positive integer.

According to the pixel circuit and the display apparatus including the pixel circuit, the pixel circuit may include six transistors and two capacitors. The pixel circuit may operate internal compensation and have a relatively fewer transistors compared to the conventional pixel circuit, so that high integration may be achieved. Thus, the pixel circuit may be applicable to an ultra-high resolution display apparatus.

In a driving timing of the pixel circuit, the data writing period may be separated from the initialization period and the threshold voltage compensation period so that a horizontal period may be longer compared to a horizontal period in a driving timing of the conventional pixel circuit. Therefore, the demux (demultiplexer) circuit of the data driver may be readily applicable for driving plural data lines within a horizontal period.

BRIEF DESCRIPTION OF THE DRAWINGS

The above and other features and advantages of the disclosure will become more apparent by describing in detailed embodiments thereof with reference to the accompanying drawings, in which.

DETAILED DESCRIPTION OF THE EMBODIMENTS

Figure 1:
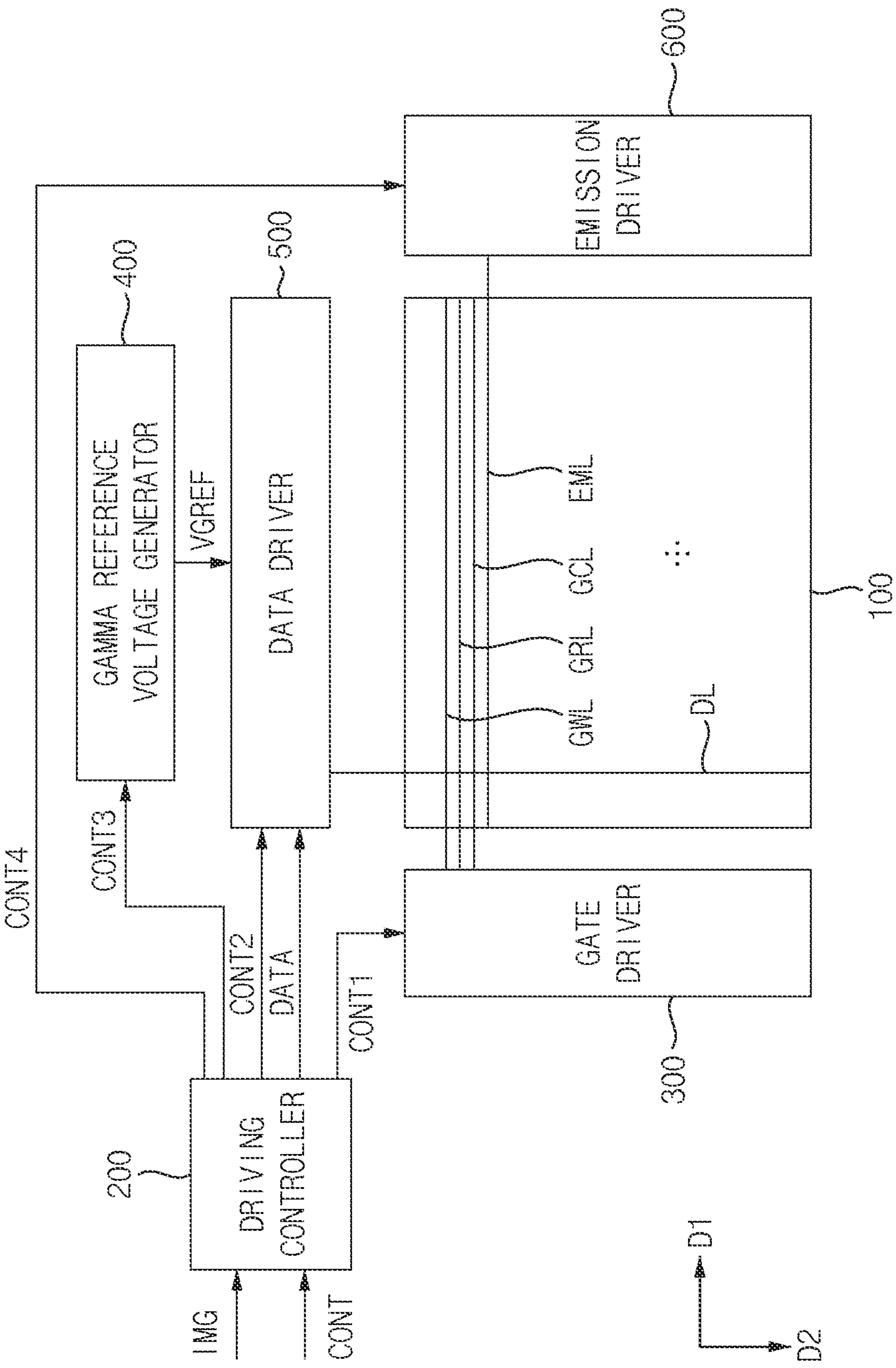
FIG. 1 is a schematic block diagram illustrating a display apparatus according to an embodiment of the present disclosure.

Hereinafter, the disclosure will be explained in detail with reference to the accompanying drawings.

When an element is referred to as being "on," "connected to," or "coupled to" another element, it may be directly on, connected to, or coupled to the other element or intervening elements or layers may be present. When, however, an element is referred to as being "directly on," "directly connected to," or "directly coupled to" another element, there are no intervening elements or layers present. To this end, the term "connected" may refer to physical, electrical, and/or fluid connection, with or without intervening elements.

As customary in the field, some embodiments are described and illustrated in the accompanying drawings in terms of functional blocks, units, parts, and/or modules. Those skilled in the art will appreciate that these blocks, units, parts, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, parts, and/or modules being implemented by microprocessors or other similar hardware, they may be programmed and controlled using software (e.g., microcode) to perform various functions discussed herein and may optionally be driven by firmware and/or software. It is also contemplated that each block, unit, part, and/or module may be implemented by dedicated hardware, or as a combination of dedicated hardware to perform some functions and a processor (e.g., one or more programmed microprocessors and associated circuitry) to perform other functions. Also, each block, unit, part, and/or module of some embodiments may be physically separated into two or more interacting and discrete blocks, units, parts, and/or modules without departing from the scope of the disclosure. Further, the blocks, units, parts, and/or modules of some embodiments may be physically combined into more complex blocks, units, parts, and/or modules without departing from the scope of the disclosure.

The term "about" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

The term "and/or" includes all combinations of one or more of which associated configurations may define. For example, "A and/or B" may be understood to mean "A, B, or A and B."

For the purposes of this disclosure, the phrase "at least one of A and B" may be construed as A only, B only, or any combination of A and B. Also, "at least one of X, Y, and Z" and "at least one selected from the group consisting of X, Y, and Z" may be construed as X only, Y only, Z only, or any combination of two or more of X, Y, and Z.

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein.

FIG. 1 is a schematic block diagram illustrating a display apparatus according to an embodiment of the disclosure.

Referring to FIG. 1, the display apparatus may include a display panel 100 and a display panel driver. The display panel driver may include a driving controller 200, a gate driver 300, a gamma reference voltage generator 400, a data driver 500, and an emission driver 600.

The display panel 100 may have a display region on which an image is displayed and a peripheral region adjacent to the display region.

The display panel 100 may include gate lines GWL, GRL, and GCL, data lines DL, emission lines EML, and pixels electrically connected to the gate lines GWL, GRL, and GCL, the data lines DL, and the emission lines EML. The gate lines GWL, GRL, and GCL may extend in a first direction D1, the data lines DL may extend in a second direction D2 intersecting (or crossing) the first direction D1, and the emission lines EML may extend in the first direction D1.

The driving controller 200 may receive input image data IMG and an input control signal CONT from an external apparatus. For example, the input image data IMG may include red image data, green image data, and blue image data. The input image data IMG may include white image data. The input image data IMG may include magenta image data, cyan image data, and yellow image data. The input control signal CONT may include a master clock signal and a data enable signal. The input control signal CONT may further include a vertical synchronizing signal and a horizontal synchronizing signal.

The driving controller 200 may generate a first control signal CONT1, a second control signal CONT2, a third control signal CONT3, a fourth control signal CONT4, and a data signal DATA based on the input image data IMG and the input control signal CONT.

The driving controller 200 may generate the first control signal CONT1 for controlling an operation of the gate driver 300 based on the input control signal CONT, and may output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and may output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT, and may output the third control signal CONT3 to the gamma reference voltage generator 400.

The driving controller 200 may generate the fourth control signal CONT4 for controlling an operation of the emission driver 600 based on the input control signal CONT, and may output the fourth control signal CONT4 to the emission driver 600.

The gate driver 300 may generate gate signals driving the gate lines GWL, GRL, and GCL in response to the first control signal CONT1 received from the driving controller 200. The gate driver 300 may output the gate signals to the gate lines GWL, GRL, and GCL. The gate signals may include a data initialization gate signal, a compensation gate signal, and a data writing gate signal.

In an embodiment of the disclosure, the gate driver 300 may be integrated on the peripheral region of the display panel 100. In an embodiment of the disclosure, the gate driver 300 may be mounted on the peripheral region of the display panel 100.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to a level of the data signal DATA.

In an embodiment, the gamma reference voltage generator 400 may be disposed in the driving controller 200 or in the data driver 500.

The data driver 500 may receive the second control signal CONT2 and the data signal DATA from the driving controller 200, and may receive the gamma reference voltages VGREF from the gamma reference voltage generator 400. The data driver 500 may convert the data signal DATA into data voltages having an analog type by using the gamma reference voltages VGREF. The data driver 500 may output the data voltages to the data lines DL.

In an embodiment of the disclosure, the data driver 500 may be integrated on the peripheral region of the display panel 100. In an embodiment of the disclosure, the data driver 500 may be mounted on the peripheral region of the display panel 100.

The emission driver 600 may generate emission signals to drive the emission lines EML in response to the fourth control signal CONT4 received from the driving controller 200. The emission driver 600 may output the emission signals to the emission lines EML.

In an embodiment of the disclosure, the emission driver 600 may be integrated on (or in) the peripheral region of the display panel 100. In an embodiment of the disclosure, the emission driver 600 may be mounted on (or in) the peripheral region of the display panel 100.

FIG. 1 illustrates that the gate driver 300 is disposed at a first side of the display panel 100 and the emission driver 600 is disposed at a second side of the display panel 100 opposite to the first side, for convenience of explanation, but the disclosure may not be limited thereto. For example, both of the gate driver 300 and the emission driver 600 may be disposed at the first side of the display panel 100. For example, the gate driver 300 and the emission driver 600 may be disposed at sides (e.g., both or opposite sides) of the display panel 100. For example, the gate driver 300 and the emission driver 600 may be integral with each other.

Figure 2:
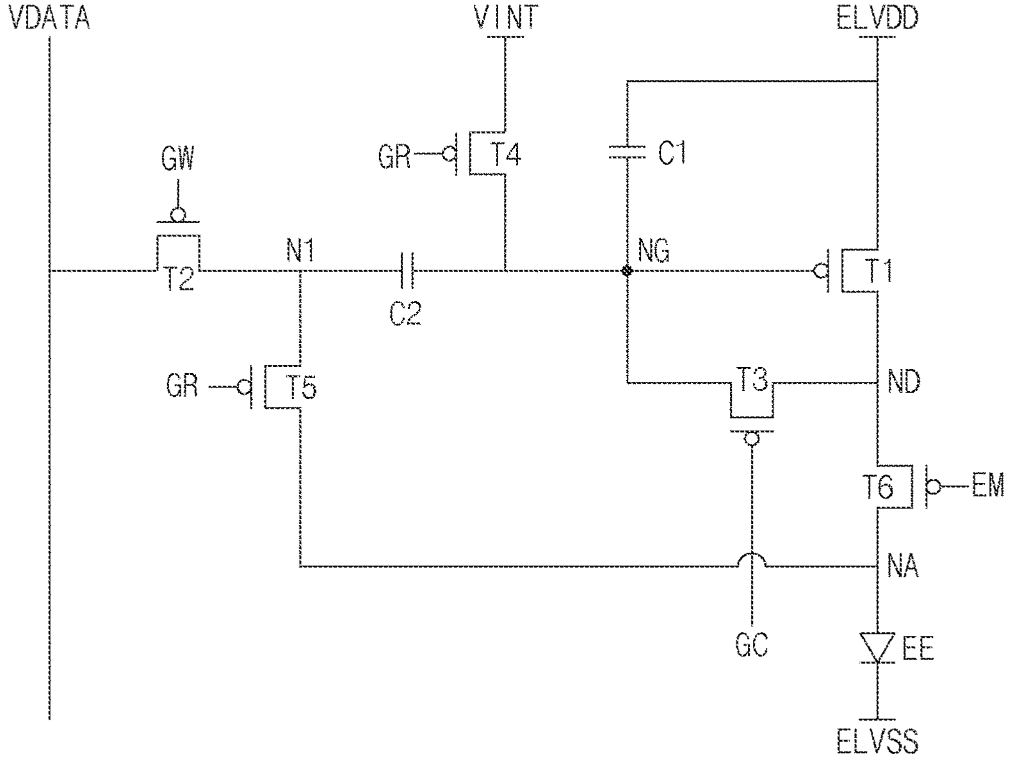
FIG. 2 is a schematic diagram of an equivalent circuit illustrating a pixel circuit of the display panel of FIG. 1.
Figure 3:
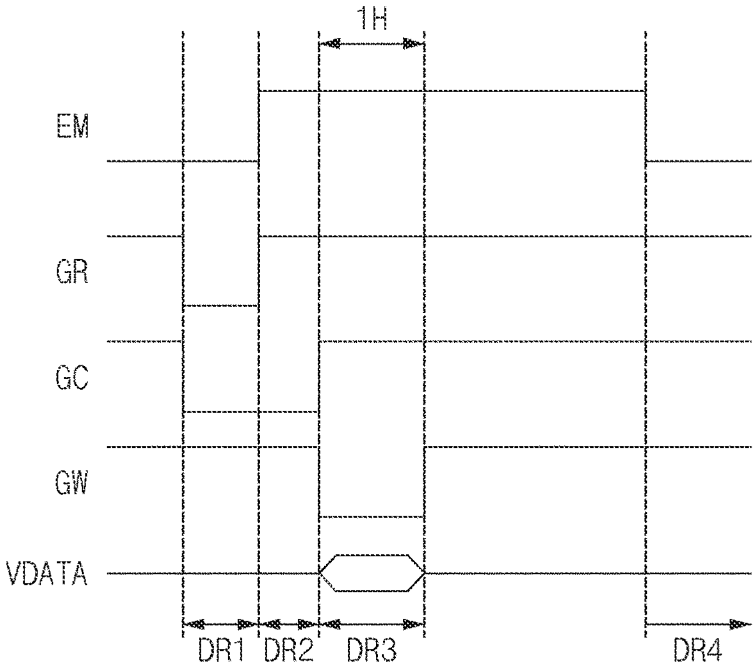
FIG. 3 is a schematic timing diagram illustrating an example of input signals applied to the pixel circuit of FIG. 2.

FIG. 2 is a schematic diagram of an equivalent circuit illustrating a pixel circuit of the display panel 100 of FIG. 1. FIG. 3 is a schematic timing diagram illustrating an example of input signals applied to the pixel circuit of FIG. 2.

Referring to FIGS. 1 to 3, the pixel circuit may include a first transistor T1 including a control electrode connected to a gate node NG, a first electrode receiving a first power voltage ELVDD, and a second electrode connected to a second node ND, a second transistor T2 including a control electrode receiving a data writing gate signal GW, a first electrode receiving a data voltage VDATA, and a second electrode connected to a first node N1, a third transistor T3 including a control electrode receiving a compensation gate signal GC, a first electrode connected to the gate node NG, and a second electrode connected to the second node ND, a fourth transistor T4 including a control electrode receiving an initialization gate signal GR, a first electrode receiving an initialization voltage VINT, and a second electrode connected to the gate node NG, a fifth transistor T5 including a control electrode receiving the initialization gate signal GR, a first electrode connected to the first node N1, and a second electrode connected to an anode node NA, a sixth transistor T6 including a control electrode receiving an emission signal EM, a first electrode connected to the second node ND, and a second electrode connected to the anode node NA, and a light emitting element EE including a first electrode connected to the anode node NA and a second electrode receiving a second power voltage ELVSS.

For example, the first power voltage ELVDD may be a high power voltage for determining a light emitting degree of the light emitting element EE. For example, the second power voltage ELVSS may be a low power voltage for determining a light emitting degree of the light emitting element EE. The first power voltage ELVDD may be greater than the second power voltage ELVSS.

The pixel circuit may further include a first capacitor C1 including a first end receiving the first power voltage ELVDD and a second end connected to the gate node NG and a second capacitor C2 including a first end connected to the first node N1 and a second end connected to the gate node NG.

The first capacitor C1 may maintain a gate-source voltage of the first transistor T1 for a frame. The second capacitor C2 may apply the data voltage VDATA to the control electrode of the first transistor T1.

As explained above, the pixel circuit may include six transistors and two capacitors. However, the embodiments are not limited thereto. For example, the pixel circuit may include different numbers of transistors and capacitors within the scope and spirit of the disclosure.

As shown in FIG. 3, in the driving timing of the pixel circuit, a data writing period DR3 may be separated from an initialization period DR1 and a threshold voltage compensation period DR2 so that a horizontal period may be longer compared to a horizontal period in a driving timing of a conventional pixel circuit.

Figure 4:
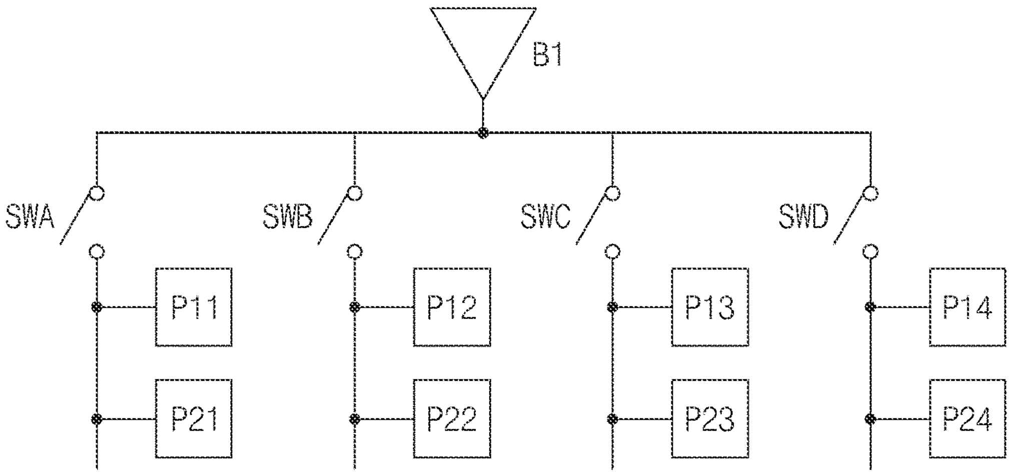
FIG. 4 is a schematic conceptual diagram illustrating a demux circuit of a data driver of FIG. 1.
Figure 5:
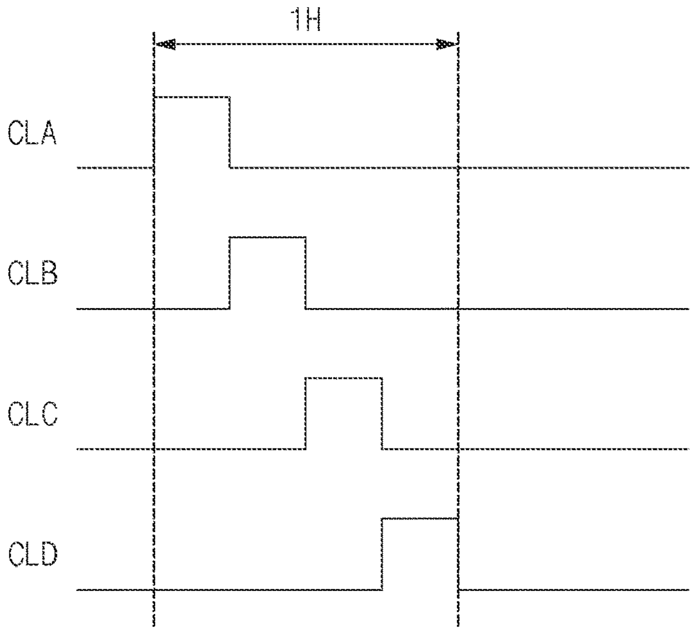
FIG. 5 is a schematic timing diagram illustrating a switching signal applied to the demux circuit of FIG. 4.

FIG. 4 is a schematic conceptual diagram illustrating a demux circuit of the data driver 500 of FIG. 1. FIG. 5 is a schematic timing diagram illustrating a switching signal applied to the demux circuit of FIG. 4.

Referring to FIGS. 1 to 5, an output buffer B1 of the data driver 500 may be connected to four data lines through the demux circuit. The demux circuit may include first to fourth switches SWA, SWB, SWC, and SWD connected by first to fourth switching signals CLA, CLB, CLC, and CLD.

For example, in case that the first switching signal CLA has an active status, the first switch SWA may be turned on so that the output buffer B1 may be connected to a first pixel P11 and a second pixel P21 through the first switch SWA.

For example, in case that the second switching signal CLB has an active status, the second switch SWB may be turned on so that the output buffer B1 may be connected to a third pixel P12 and a fourth pixel P22 through the second switch SWB.

For example, in case that the third switching signal CLC has an active status, the third switch SWC may be turned on so that the output buffer B1 may be connected to a fifth pixel P13 and a sixth pixel P23 through the third switch SWC.

For example, in case that the fourth switching signal CLD has an active status, the fourth switch SWD may be turned on so that the output buffer B1 may be connected to a seventh pixel P14 and an eighth pixel P24 through the fourth switch SWD.

As explained above, in the driving timing of the pixel circuit, the data writing period DR3 may be separated from the initialization period DR1 and the threshold voltage compensation period DR2 so that a horizontal period 1H may be longer compared to a horizontal period 1H in a driving timing of a conventional pixel circuit. In case that the horizontal period 1H is relatively long, the demux circuit may be readily applicable for driving data lines within the horizontal period 1H.

FIGS. 4 and 5 illustrate a 4:1 demux circuit in which an output buffer of the data driver 500 is connected to four data lines, but the disclosure may not be limited thereto. As another example, an output buffer of the data driver 500 may be connected to two to three data lines. As another example, an output buffer of the data driver 500 may be connected to five or more data lines.

Figure 6:
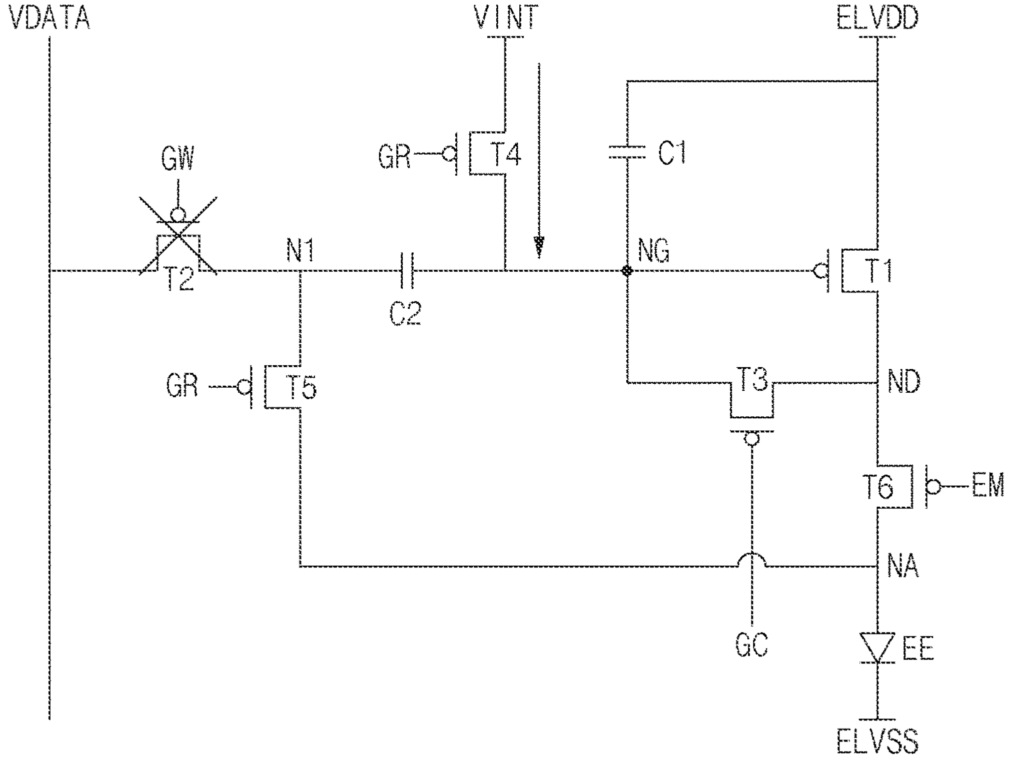
FIG. 6 is a schematic diagram of an equivalent circuit illustrating an operation of the pixel circuit of FIG. 2 in a first period in a driving timing.
Figure 7:
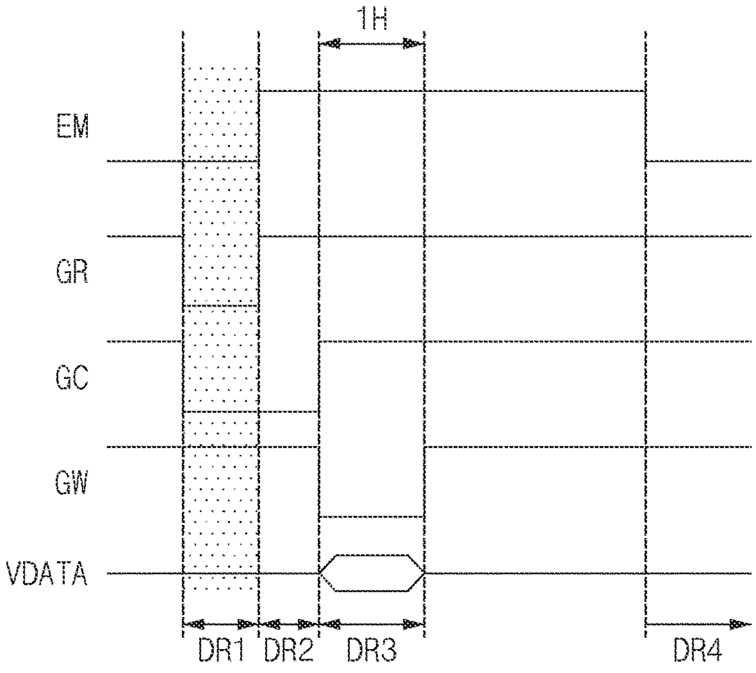
FIG. 7 is a schematic timing diagram illustrating an example of input signals applied to the pixel circuit of FIG. 2 in the first period.
Figure 8:
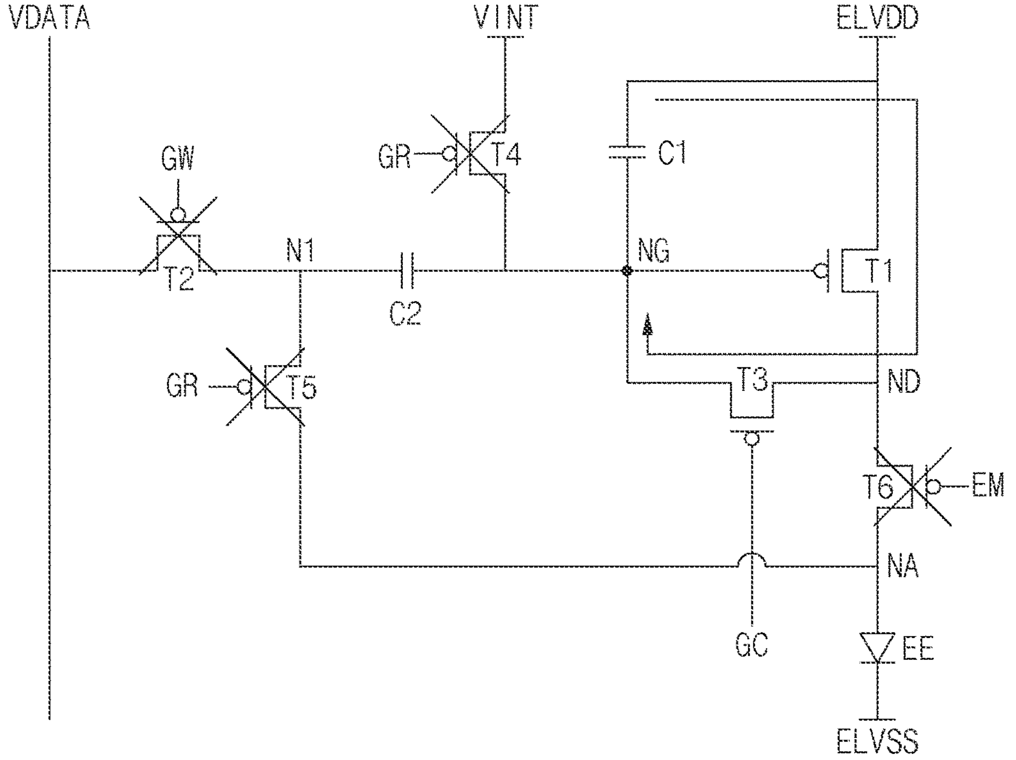
FIG. 8 is a schematic diagram of an equivalent circuit illustrating an operation of the pixel circuit of FIG. 2 in a second period in the driving timing.
Figure 9:
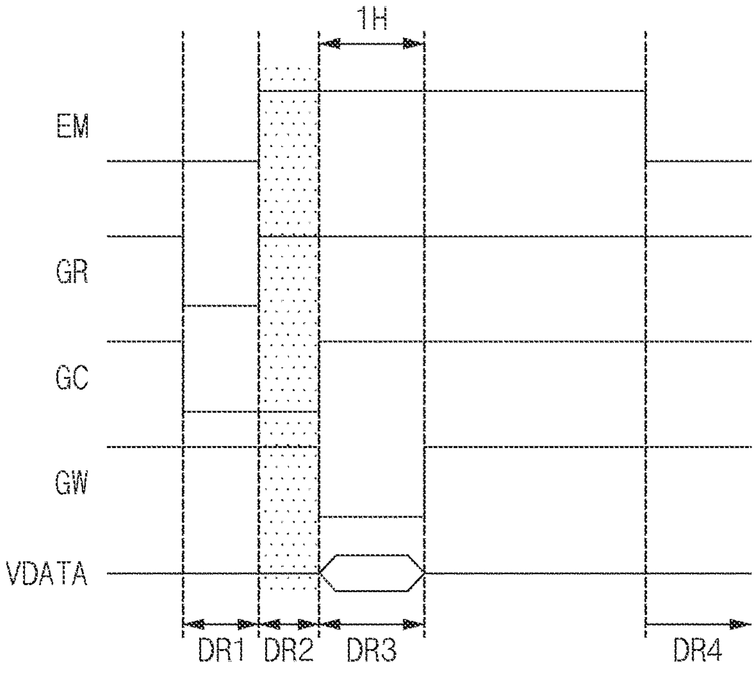
FIG. 9 is a schematic timing diagram illustrating an example of input signals applied to the pixel circuit of FIG. 2 in the second period.
Figure 10:
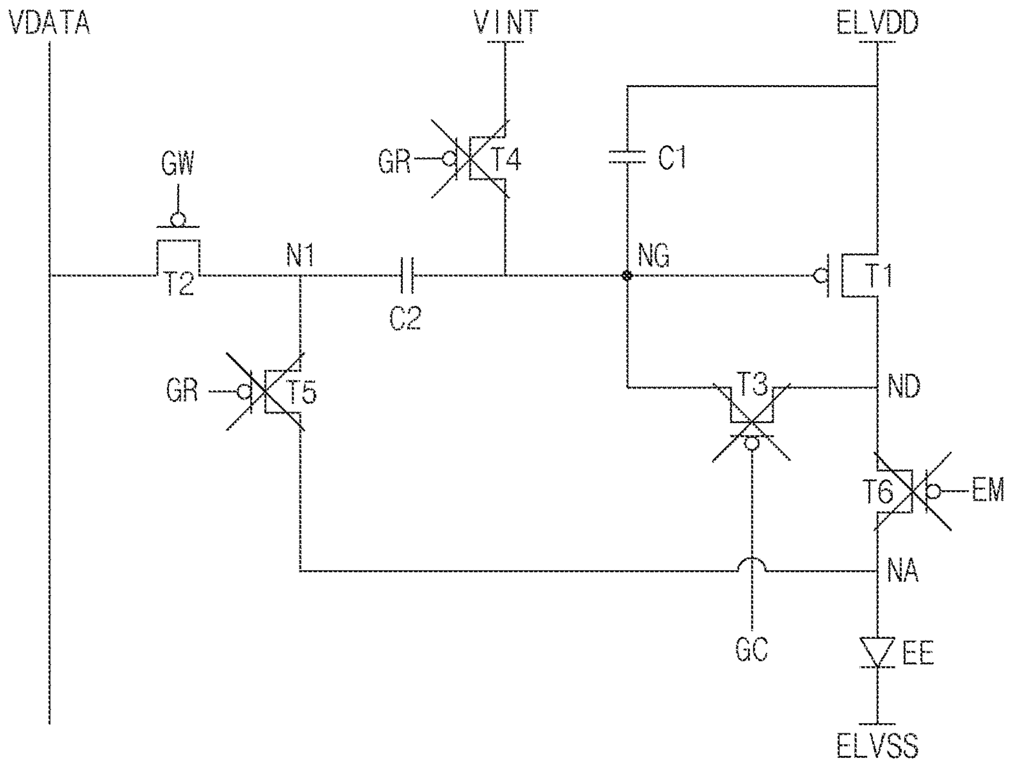
FIG. 10 is a schematic diagram of an equivalent circuit illustrating an operation of the pixel circuit of FIG. 2 in a third period in the driving timing.
Figure 11:
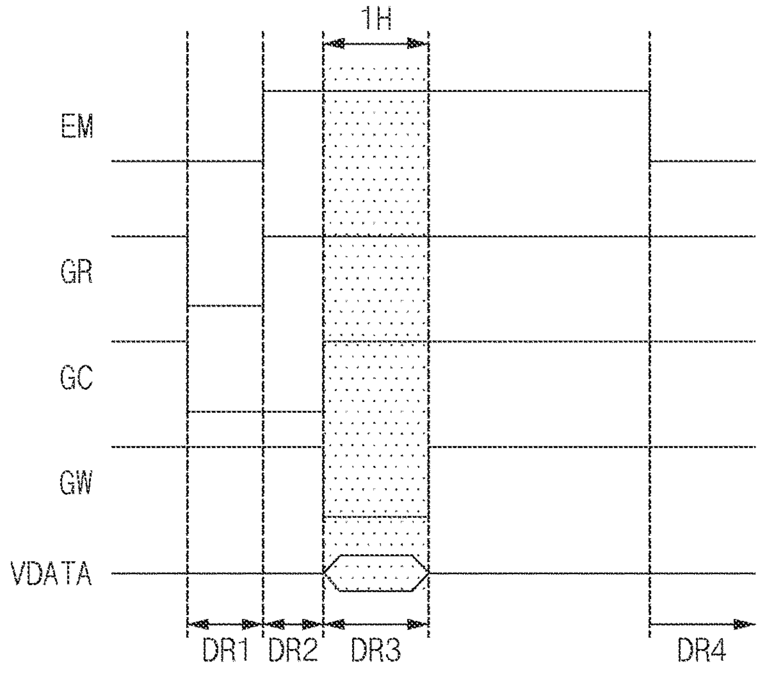
FIG. 11 is a schematic timing diagram illustrating an example of input signals applied to the pixel circuit of FIG. 2 in the third period.
Figure 12:
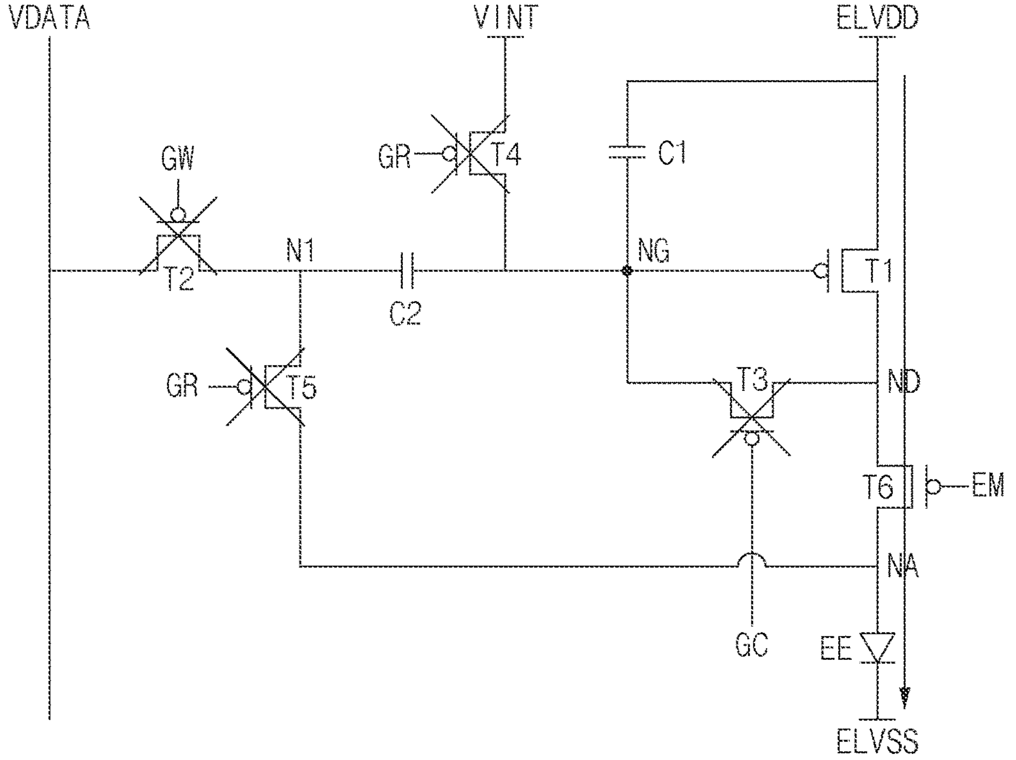
FIG. 12 is a schematic diagram of an equivalent circuit illustrating an operation of the pixel circuit of FIG. 2 in a fourth period in the driving timing.
Figure 13:
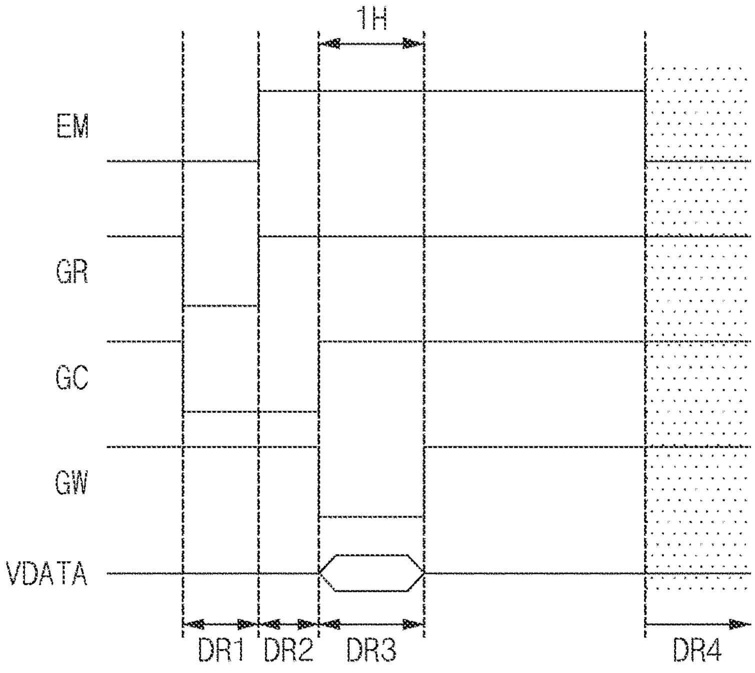
FIG. 13 is a schematic timing diagram illustrating an example of input signals applied to the pixel circuit of FIG. 2 in the fourth period.

FIG. 6 is a schematic diagram of an equivalent circuit illustrating an operation of the pixel circuit of FIG. 2 in a first period DR1 in a driving timing. FIG. 7 is a schematic timing diagram illustrating an example of input signals applied to the pixel circuit of FIG. 2 in the first period DR1. FIG. 8 is a schematic diagram of an equivalent circuit illustrating an operation of the pixel circuit of FIG. 2 in a second period DR2 in the driving timing. FIG. 9 is a schematic timing diagram illustrating an example of input signals applied to the pixel circuit of FIG. 2 in the second period DR2. FIG. 10 is a schematic diagram of an equivalent circuit illustrating an operation of the pixel circuit of FIG. 2 in a third period DR3 in the driving timing. FIG. 11 is a schematic timing diagram illustrating an example of input signals applied to the pixel circuit of FIG. 2 in the third period DR3. FIG. 12 is a schematic diagram of an equivalent circuit illustrating an operation of the pixel circuit of FIG. 2 in a fourth period DR4 in the driving timing. FIG. 13 is a schematic timing diagram illustrating an example of input signals applied to the pixel circuit of FIG. 2 in the fourth period DR4.

Hereinafter, the driving timing of the pixel circuit is explained in detail referring to FIGS. 6 to 13. The first period DR1 explained referring to FIGS. 6 and 7 may be an initialization period. The second period DR2 explained referring to FIGS. 8 and 9 may be a threshold voltage compensation period. The third period DR3 explained referring to FIGS. 10 and 11 may be a data writing period. The fourth period DR4 explained referring to FIGS. 12 and 13 may be a light emitting period.

Referring to FIGS. 6 and 7, in the first period DR1, the emission signal EM may have an active level, the initialization gate signal GR may have an active level, the compensation gate signal GC may have an active level, and the data writing gate signal GW may have an inactive level.

For example, the pixel circuit may include p-type transistors T1 to T6. Thus, inactive levels of the emission signal EM, the initialization gate signal GR, the compensation gate signal GC, and the data writing gate signal GW may be a high level. Active levels of the emission signal EM, the initialization gate signal GR, the compensation gate signal GC, and the data writing gate signal GW may be a low level.

However, the disclosure may not be limited thereto. In case that the pixel circuit includes n-type transistors T1 to T6, inactive levels of the emission signal EM, the initialization gate signal GR, the compensation gate signal GC, and the data writing gate signal GW may be a low level, and active levels of the emission signal EM, the initialization gate signal GR, the compensation gate signal GC, and the data writing gate signal GW may be a high level.

In the first period DR1, the initialization gate signal GR may have the active level so that the fourth transistor T4 is turned on by the initialization gate signal GR and the gate node NG may be initialized to the initialization voltage VINT.

In the first period DR1, the compensation gate signal GC and the emission signal EM may have the active levels so that the third transistor T3 is turned on by the compensation gate signal GC and the sixth transistor T6 is turned on by the emission signal EM, and thus, the anode node NA may be initialized to the initialization voltage VINT.

In the first period DR1, the fifth transistor T5 may be turned on by the initialization gate signal GR, and the first node N1 may be initialized to the initialization voltage VINT.

Referring to FIGS. 8 and 9, in the second period DR2 subsequent to the first period DR1, the emission signal EM may have the inactive level, the initialization gate signal GR may have an inactive level, the compensation gate signal GC may have the active level, and the data writing gate signal GW may have the inactive level.

In the second period DR2, the first transistor T1 may be turned on by the initialization voltage VINT, and the third transistor T3 may be turned on by the compensation gate signal GC.

The first power voltage ELVDD may be applied to the first end of the first capacitor C1, and the voltage of the second end of the first capacitor C1 may be a sum of the first power voltage ELVDD and the threshold voltage Vth of the first transistor T1, so that the threshold voltage Vth of the first transistor T1 may be stored in the first capacitor C1.

Referring to FIGS. 10 and 11, in the third period DR3 subsequent to the second period DR2, the emission signal EM may have the inactive level, the initialization gate signal GR may have the inactive level, the compensation gate signal GC may have an inactive level, and the data writing gate signal GW may have an active level.

In the third period DR3, the second transistor T2 may be turned on by the data writing gate signal GW. The data voltage VDATA may be applied to the gate node NG through the second capacitor C2 in a bootstrap manner.

In the third period DR3, the voltage of the first node N1 may be VDATA, the voltage of the gate node NG may be ELVDD+Vth+a (VDATA-VINT). Herein, a=C2/(C1+C2). In the above equation, C1 represents a capacitance of the first capacitor C1, and C2 represents a capacitance of the second capacitor C2. For example, the capacitance of the first capacitor C1 may be greater than the capacitance of the second capacitor C2. For example, a ratio between the capacitance of the first capacitor C1 and the capacitance of the second capacitor C2 may be about 2:1.

Referring to FIGS. 12 and 13, in the fourth period DR4 subsequent to the third period DR3, the emission signal EM may have the active level, the initialization gate signal GR may have the inactive level, the compensation gate signal GC may have the inactive level, and the data writing gate signal GW may have the inactive level.

In the fourth period DR4, the first transistor T1 may be turned on by the data voltage VDATA, and the sixth transistor T6 may be turned on by the emission signal EM.

In the fourth period DR4, a current may flow through a path of the first transistor T1, the sixth transistor T6, and the light emitting element EE so that the light emitting element EE emits light. A light emitting degree of the light emitting element EE may be determined by a gate-source voltage of the first transistor T1.

In case that the current flowing through the light emitting element EE is IEE, and k is a constant, IEE satisfies following Equation 1. Equation 2 may be obtained by rearranging Equation 1.

$$IEE = \frac{k}{2}(ELVDD - (ELVDD + Vth + a(VDATA - VINT)) + Vth)^2 \quad \text{[Equation 1]}$$

-continued $$IEE = \frac{k}{2}(a(VINT - VDATA))^1 \quad \text{[Equation 2]}$$

The current flowing through the light emitting element EE may not have the Vth component, so that it may be referred that the threshold voltage Vth of the first transistor T1 is compensated in the pixel circuit.

According to this embodiment, the pixel circuit may include six transistors T1 to T6 and two capacitors C1 and C2. However, the embodiments are not limited thereto. For example, the pixel circuit may operate internal compensation and have relatively fewer transistors compared to the conventional pixel circuit, so that high integration may be achieved. Thus, the pixel circuit may be applicable to an ultra-high resolution display apparatus.

In a driving timing of the pixel circuit, the data writing period DR3 may be separated from the initialization period DR1 and the threshold voltage compensation period DR2 so that a horizontal period may be longer compared to a horizontal period in a driving timing of the conventional pixel circuit. Therefore, the demux circuit of the data driver 500 may be readily applicable for driving several data lines within a horizontal period.

Figure 14:
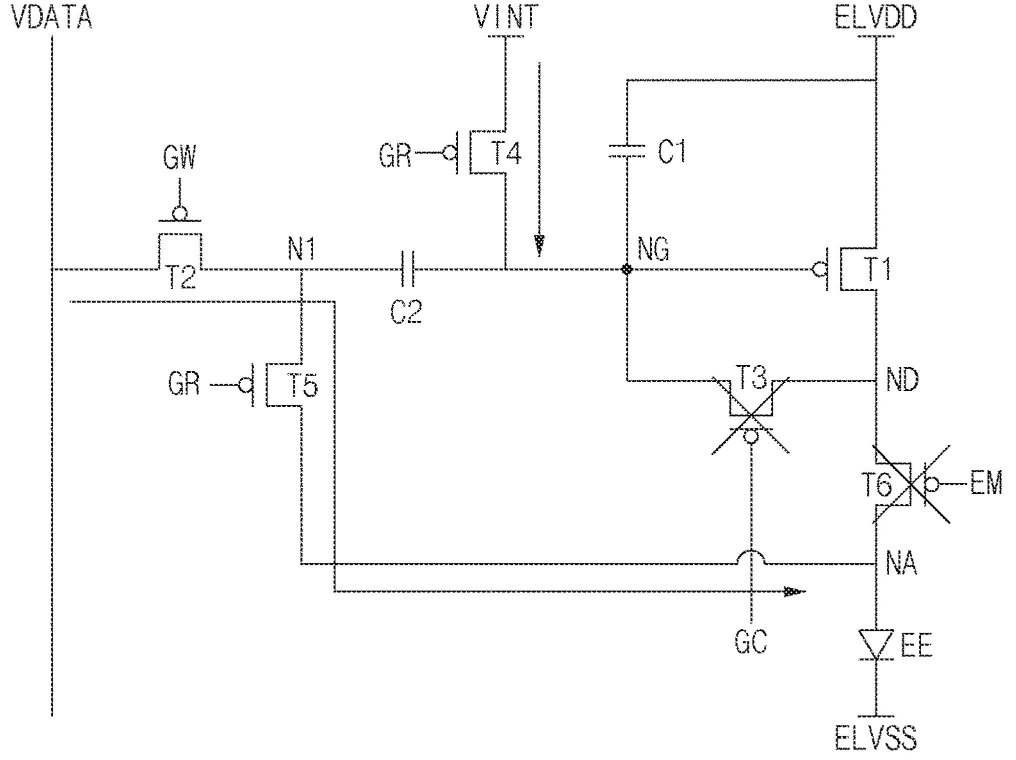
FIG. 14 is a schematic diagram of an equivalent circuit illustrating an operation of the pixel circuit of FIG. 2 in a first period in a driving timing according to an embodiment of the present disclosure.
Figure 15:
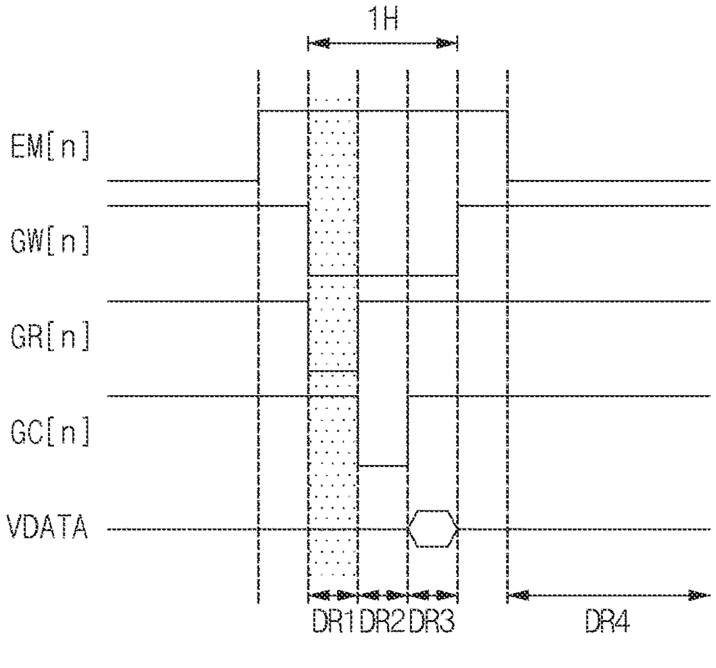
FIG. 15 is a schematic timing diagram illustrating an example of input signals applied to the pixel circuit of FIG. 2 in the first period.
Figure 16:
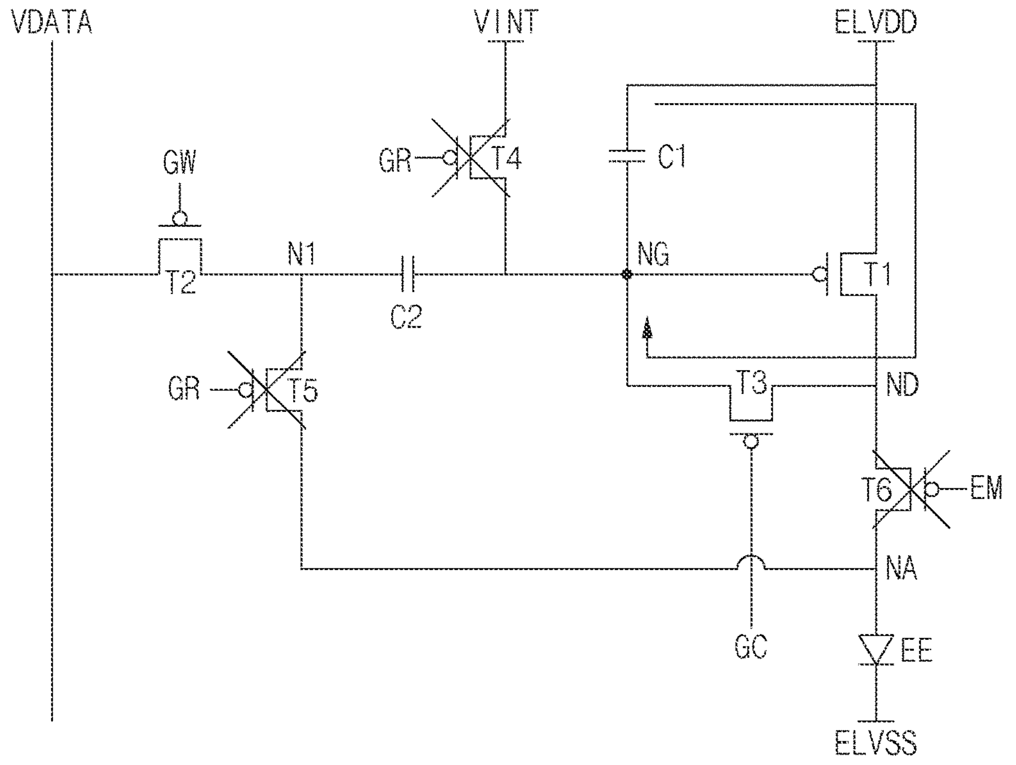
FIG. 16 is a schematic diagram of an equivalent circuit illustrating an operation of the pixel circuit of FIG. 2 in a second period in the driving timing.
Figure 17:
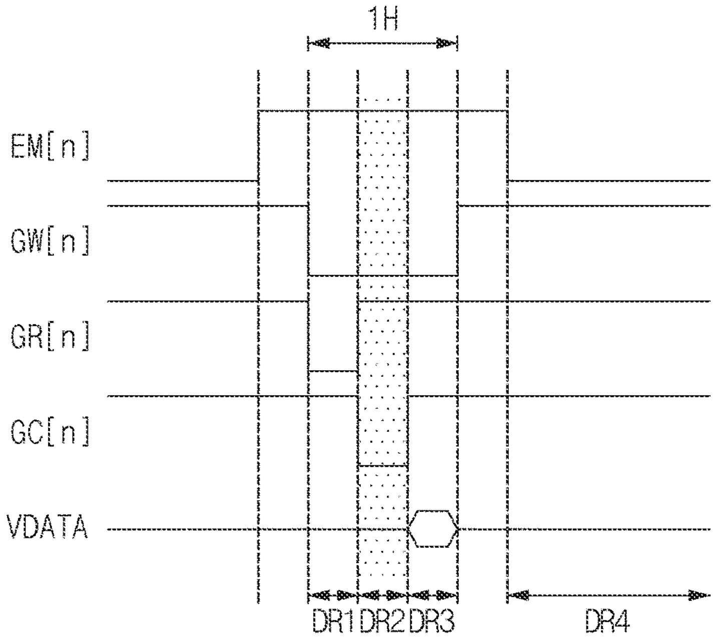
FIG. 17 is a schematic timing diagram illustrating an example of input signals applied to the pixel circuit of FIG. 2 in the second period.
Figure 18:
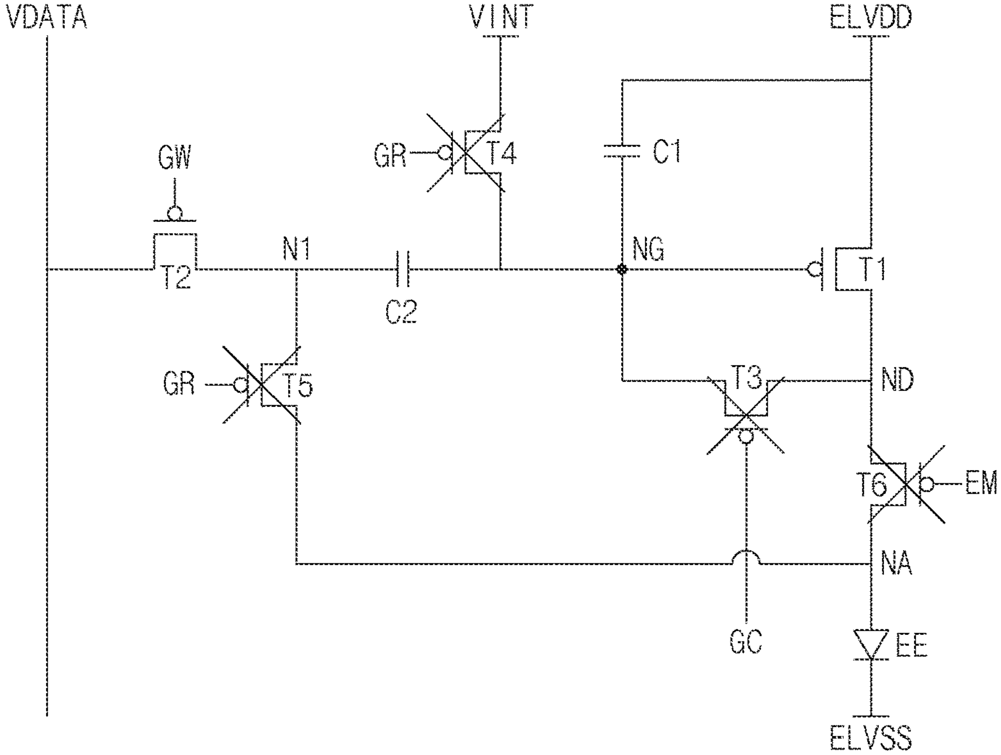
FIG. 18 is a schematic diagram of an equivalent circuit illustrating an operation of the pixel circuit of FIG. 2 in a third period in the driving timing.
Figure 19:
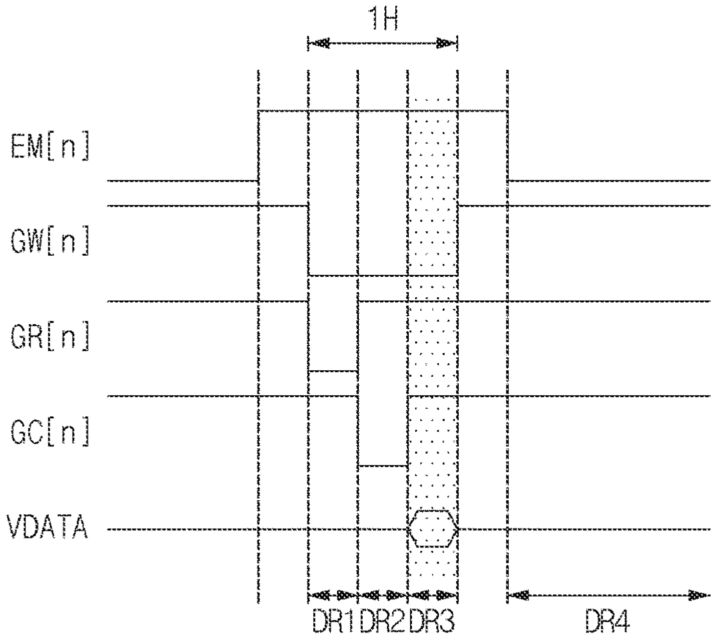
FIG. 19 is a schematic timing diagram illustrating an example of input signals applied to the pixel circuit of FIG. 2 in the third period.
Figure 20:
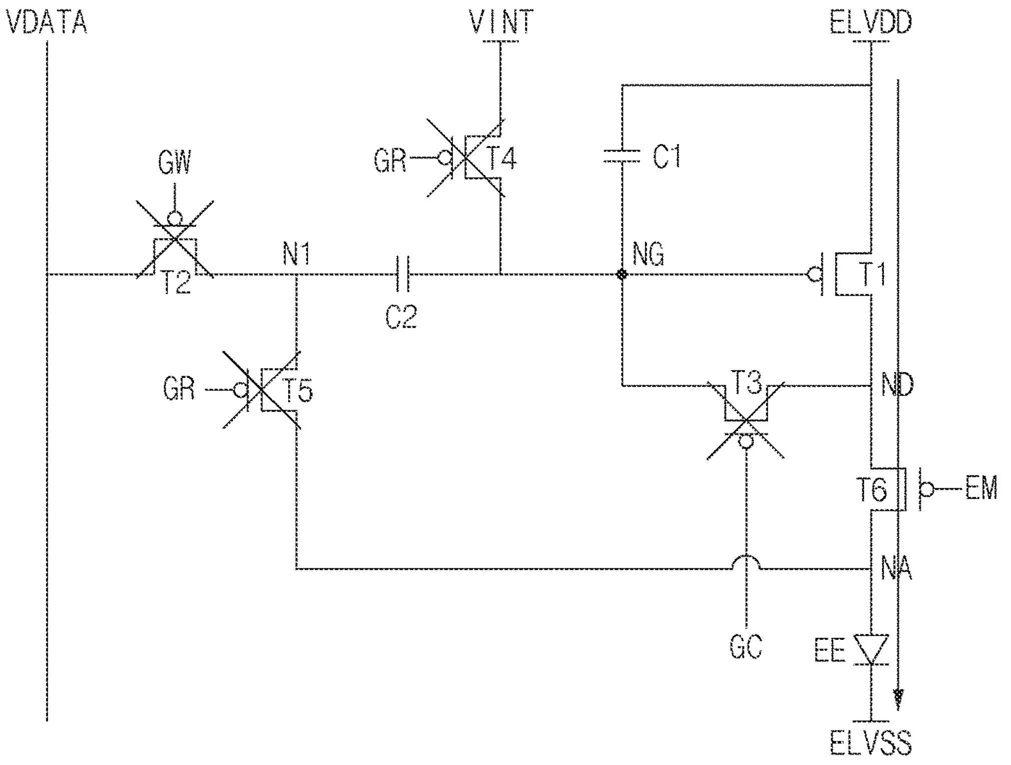
FIG. 20 is a schematic diagram of an equivalent circuit illustrating an operation of the pixel circuit of FIG. 2 in a fourth period in the driving timing.
Figure 21:
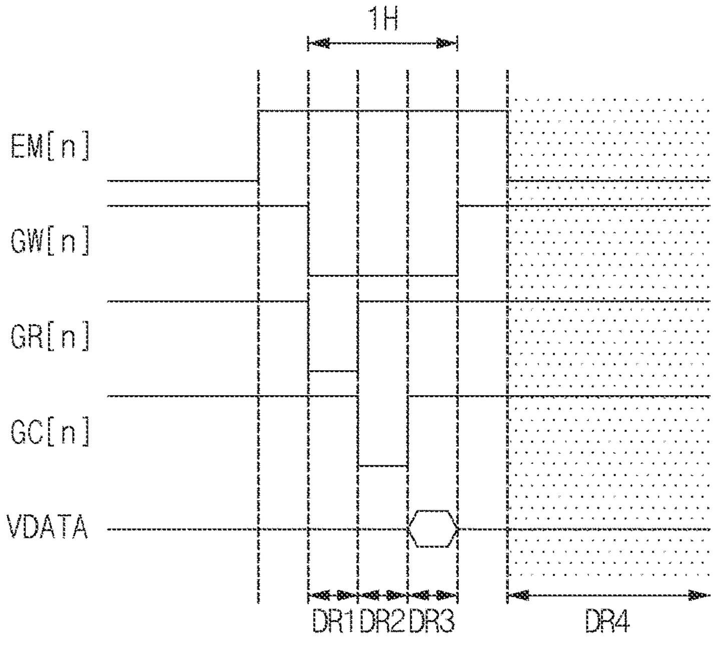
FIG. 21 is a schematic timing diagram illustrating an example of input signals applied to the pixel circuit of FIG. 2 in the fourth period.

FIG. 14 is a schematic diagram of an equivalent circuit illustrating an operation of the pixel circuit of FIG. 2 in a first period DR1 in a driving timing according to an embodiment of the disclosure. FIG. 15 is a schematic timing diagram illustrating an example of input signals applied to the pixel circuit of FIG. 2 in the first period DR1. FIG. 16 is a schematic diagram of an equivalent circuit illustrating an operation of the pixel circuit of FIG. 2 in a second period DR2 in the driving timing. FIG. 17 is a schematic timing diagram illustrating an example of input signals applied to the pixel circuit of FIG. 2 in the second period DR2. FIG. 18 is a schematic diagram of an equivalent circuit illustrating an operation of the pixel circuit of FIG. 2 in a third period DR3 in the driving timing. FIG. 19 is a schematic timing diagram illustrating an example of input signals applied to the pixel circuit of FIG. 2 in the third period DR3. FIG. 20 is a schematic diagram of an equivalent circuit illustrating an operation of the pixel circuit of FIG. 2 in a fourth period DR4 in the driving timing. FIG. 21 is a schematic timing diagram illustrating an example of input signals applied to the pixel circuit of FIG. 2 in the fourth period DR4.

The pixel circuit according to this embodiment may be substantially the same as the pixel circuit of the previous embodiment explained referring to FIG. 2, and the driving timing according to this embodiment may be different from the driving timing of the previous embodiment explained referring to FIG. 3. Thus, the same reference numerals will be used to refer to the same or like parts as those described in the previous embodiment, and any repetitive explanation concerning the above elements will be omitted.

Hereinafter, the driving timing of the pixel circuit is explained in detail referring to FIGS. 14 to 21. The first period DR1 explained referring to FIGS. 14 and 15 may be an initialization period. The second period DR2 explained referring to FIGS. 16 and 17 may be a threshold voltage compensation period. The third period DR3 explained referring to FIGS. 18 and 19 may be a data writing period. The fourth period DR4 explained referring to FIGS. 20 and 21 may be a light emitting period.

Referring to FIGS. 14 and 15, in the first period DR1, an emission signal EM[n] may have an inactive level, a data writing gate signal GW[n] may have an active level, an initialization gate signal GR[n] may have an active level, and a compensation gate signal GC[n] may have an inactive level. Herein, [n] may mean an n-th stage. The emission signal EM[n], the data writing gate signal GW[n], the initialization gate signal GR[n], and the compensation gate signal GC[n] of the n-th stage may be applied to an n-th pixel row. For example, [n] may mean a present stage. Herein, n is a positive integer.

In the first period DR1, the second transistor T2 and the fifth transistor T5 may be turned on so that the anode node NA may be initialized by a reference voltage applied through the data line.

In the first period DR1, the fourth transistor T4 may be turned on so that the gate node NG may be initialized by the initialization voltage VINT.

Referring to FIGS. 16 and 17, in the second period DR2 subsequent to the first period DR1, the emission signal EM[n] may have the inactive level, the data writing gate signal GW[n] may have the active level, the initialization gate signal GR[n] may have an inactive level, and the compensation gate signal GC[n] may have an active level.

In the second period DR2, the first transistor T1 and the third transistor T3 may be turned on so that the threshold voltage Vth of the first transistor T1 may be stored in the first capacitor C1.

Referring to FIGS. 18 and 19, in the third period DR3 subsequent to the second period DR2, the emission signal EM[n] may have the inactive level, the data writing gate signal GW[n] may have the active level, the initialization gate signal GR[n] may have the inactive level, and the compensation gate signal GC[n] may have the inactive level.

In the third period DR3, the second transistor T2 may be turned on so that the data voltage VDATA may be applied to the gate node NG through the second capacitor C2 in a bootstrap manner.

Referring to FIGS. 20 and 21, in the fourth period DR4 subsequent to the third period DR3, the emission signal EM[n] may have an active level, the data writing gate signal GW[n] may have an inactive level, the initialization gate signal GR[n] may have the inactive level, and the compensation gate signal GC[n] may have the inactive level.

In the fourth period DR4, the first transistor T1 may be turned on by the data voltage VDATA, and the sixth transistor T6 may be turned on by the emission signal EM[n].

In the fourth period DR4, a current may flow through a path of the first transistor T1, the sixth transistor T6, and the light emitting element EE so that the light emitting element EE emits light. A light emitting degree of the light emitting element EE may be determined by a gate-source voltage of the first transistor T1.

According to this embodiment, the pixel circuit may include six transistors T1 to T6 and two capacitors C1 and C2. However, the embodiments are not limited thereto, and the pixel circuit may include different number. For example, the pixel circuit may operate internal compensation and have relatively fewer transistors compared to the conventional pixel circuit, so that high integration may be achieved. Thus, the pixel circuit may be applicable to an ultra-high resolution display apparatus.

Figure 22:
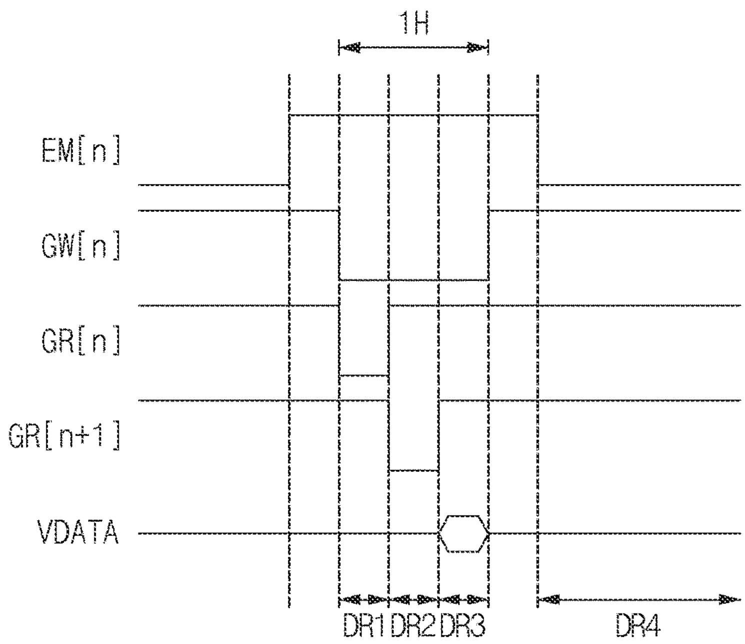
FIG. 22 is a schematic timing diagram illustrating an example of input signals applied to the pixel circuit of FIG. 2 in a driving timing according to an embodiment of the present disclosure.

FIG. 22 is a schematic timing diagram illustrating an example of input signals applied to the pixel circuit of FIG. 2 in a driving timing according to an embodiment of the disclosure.

The pixel circuit according to this embodiment may be substantially the same as the pixel circuit of the previous embodiment explained referring to FIG. 2, and the driving timing according to this embodiment may be substantially the same as the driving timing of the previous embodiment explained referring to FIGS. 14 to 21 except that the compensation gate signal GC[n] of the present stage may be replaced with the initialization gate signal GR[n+1] of the next stage. Thus, the same reference numerals will be used to refer to the same or like parts as those described in the previous embodiment, and any repetitive explanation concerning the above elements will be omitted.

Referring to FIG. 22, the compensation gate signal GC[n] of an n-th stage may be the initialization gate signal GR[n+1] of an (n+1)-th stage. Herein, [n] may mean the n-th stage and [n+1] may mean the (n+1)-th stage. The emission signal EM[n], the data writing gate signal GW[n], the initialization gate signal GR[n], and the compensation gate signal GC[n] of the n-th stage may be applied to an n-th pixel row. The emission signal EM[n+1], the data writing gate signal GW[n+1], the initialization gate signal GR[n+1], and the compensation gate signal GC[n+1] of the (n+1)-th stage may be applied to an (n+1)-th pixel row. For example, [n] may mean a present stage, and [n+1] may mean a next stage. Herein, n is a positive integer.

In the driving timing of FIGS. 14 to 21, the compensation gate signal GC[n] and the initialization gate signal GR[n] have the same amplitude and different timings. Thus, in this embodiment, the compensation gate signal GC[n] of the present stage may be replaced with the initialization gate signal GR[n+1] of the next stage. A circuit for generating the compensation gate signal GC[n] in the gate driver 300 may be omitted so that a cost of manufacturing the gate driver 300 may be reduced. In case that the gate driver 300 is mounted on or integrated on the display panel 100, a dead space of the display panel 100 may be reduced.

Figure 23:
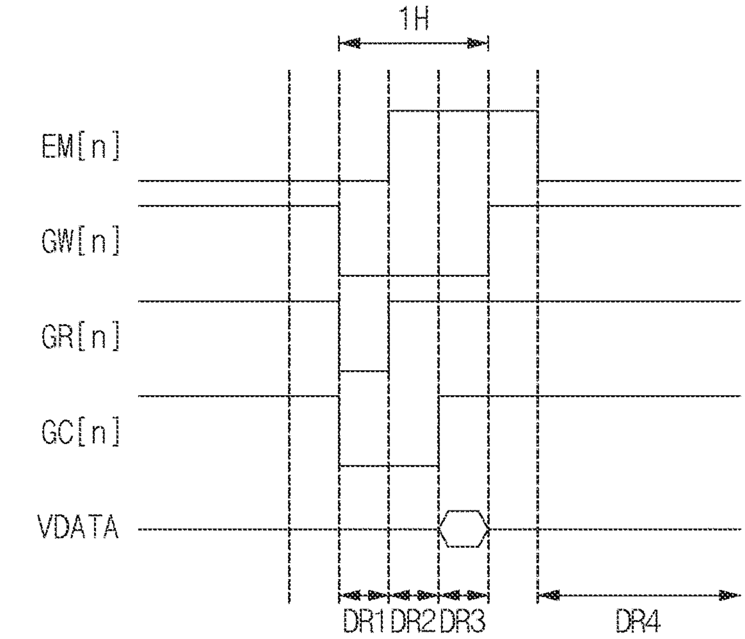
FIG. 23 is a schematic timing diagram illustrating an example of input signals applied to the pixel circuit of FIG. 2 in a driving timing according to an embodiment of the present disclosure.

FIG. 23 is a schematic timing diagram illustrating an example of input signals applied to the pixel circuit of FIG. 2 in a driving timing according to an embodiment of the disclosure.

The pixel circuit according to this embodiment may be substantially the same as the pixel circuit of the previous embodiment explained referring to FIG. 2, and the driving timing according to this embodiment may be different from the driving timing of the previous embodiment explained referring to FIG. 3. Thus, the same reference numerals will be used to refer to the same or like parts as those described in the previous embodiment, and any repetitive explanation concerning the above elements will be omitted.

Hereinafter, the driving timing of the pixel circuit is explained in detail referring to FIG. 23. The first period DR1 of FIG. 23 may be an initialization period. The second period DR2 of FIG. 23 may be a threshold voltage compensation period. The third period DR3 of FIG. 23 may be a data writing period. The fourth period DR4 of FIG. 23 may be a light emitting period.

Referring to FIG. 23, in the first period DR1, the emission signal EM[n] may have an active level, the data writing gate signal GW[n] may have an active level, the initialization gate signal GR[n] may have an active level, and the compensation gate signal GC[n] may have an active level. Herein, [n] may mean an n-th stage. The emission signal EM[n], the data writing gate signal GW[n], the initialization gate signal GR[n], and the compensation gate signal GC[n] of the n-th stage may be applied to an n-th pixel row. For example, [n] may mean a present stage. Herein, n is a positive integer.

In the first period DR1, the second transistor T2 and the fifth transistor T5 may be turned on so that the anode node NA may be initialized by a reference voltage applied through the data line.

In the first period DR1, the fourth transistor T4 may be turned on so that the gate node NG may be initialized by the initialization voltage VINT.

In the first period DR1, the third transistor T3 may be turned on so that the second node ND may be initialized by the initialization voltage VINT.

In the second period DR2 subsequent to the first period DR1, the emission signal EM[n] may have an inactive level, the data writing gate signal GW[n] may have the active level, the initialization gate signal GR[n] may have an inactive level, and the compensation gate signal GC[n] may have the active level.

In the second period DR2, the first transistor T1 and the third transistor T3 may be turned on so that the threshold voltage Vth of the first transistor T1 may be stored in the first capacitor C1.

In the third period DR3 subsequent to the second period DR2, the emission signal EM[n] may have the inactive level, the data writing gate signal GW[n] may have the active level, the initialization gate signal GR[n] may have the inactive level, and the compensation gate signal GC[n] may have an inactive level.

In the third period DR3, the second transistor T2 may be turned on so that the data voltage VDATA may be applied to the gate node NG through the second capacitor C2 in a bootstrap manner.

In the fourth period DR4 subsequent to the third period DR3, the emission signal EM[n] may have the active level, the data writing gate signal GW[n] may have an inactive level, the initialization gate signal GR[n] may have the inactive level, and the compensation gate signal GC[n] may have the inactive level.

In the fourth period DR4, the first transistor T1 may be turned on by the data voltage VDATA, and the sixth transistor T6 may be turned on by the emission signal EM[n].

In the fourth period DR4, a current may flow through a path of the first transistor T1, the sixth transistor T6, and the light emitting element EE so that the light emitting element EE emits light. A light emitting degree of the light emitting element EE may be determined by a gate-source voltage of the first transistor T1.

According to this embodiment, the pixel circuit may include six transistors T1 to T6 and two capacitors C1 and C2. However, the embodiments are not limited thereto, and the pixel circuit may include different numbers of transistors and capacitors within the scope and sprite of the disclosure. For example, the pixel circuit may operate internal compensation and have relatively fewer transistors compared to the conventional pixel circuit, so that high integration may be achieved. Thus, the pixel circuit may be applicable to an ultra-high resolution display apparatus.

Figure 24:
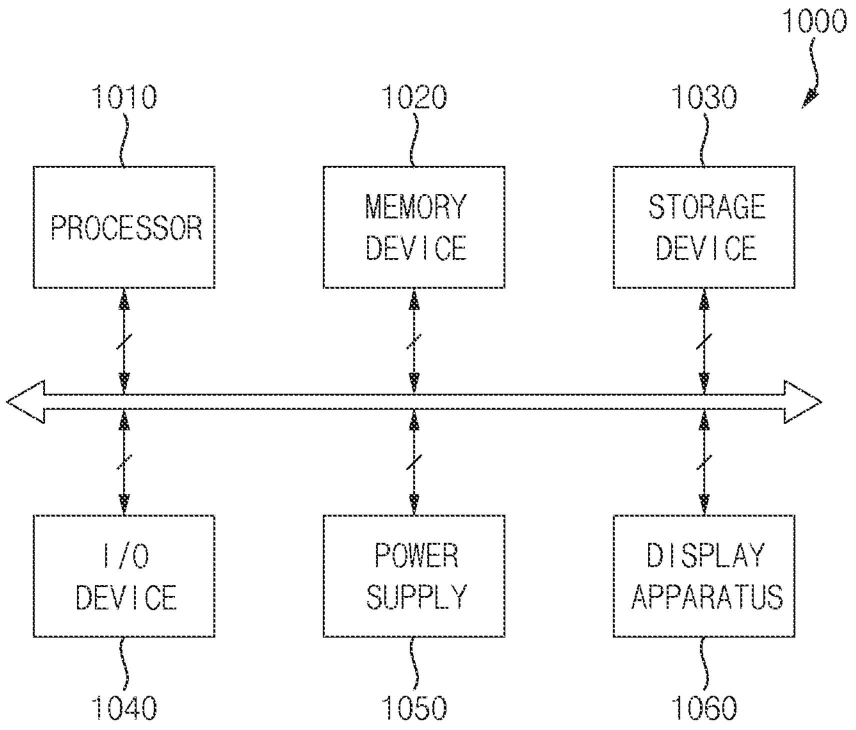
FIG. 24 is a schematic block diagram illustrating an electronic apparatus according to an embodiment of the present disclosure.
Figure 25:
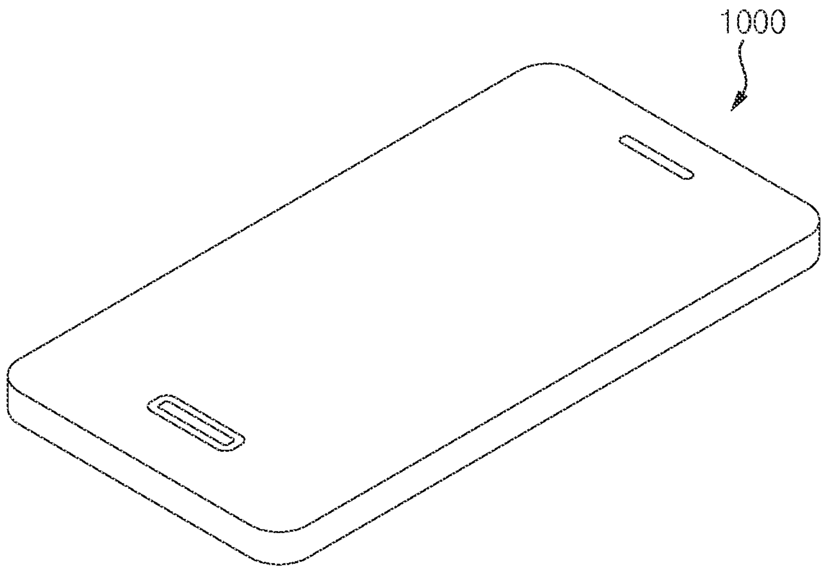
FIG. 25 is a schematic diagram illustrating an example in which the electronic apparatus of FIG. 24 is implemented as a smart phone.

FIG. 24 is a schematic block diagram illustrating an electronic apparatus according to an embodiment of the disclosure. FIG. 25 is a schematic diagram illustrating an example in which the electronic apparatus of FIG. 24 is implemented as a smart phone.

Referring to FIGS. 24 and 25, an electronic apparatus 1000 may include a processor 1010, a memory device 1020, a storage device 1030, an input/output (I/O) device 1040, a power supply 1050, and/or a display apparatus 1060. The display apparatus 1060 may be the display apparatus of FIG. 1. The electronic apparatus 1000 may further include, e.g., at least one of ports for communicating with a video card, a sound card, a memory card, a universal serial bus (USB) device, other electronic apparatuses, etc.

In an embodiment, as illustrated in FIG. 25, the electronic apparatus 1000 may be implemented as a smart phone. However, the electronic apparatus 1000 is not limited thereto. For example, the electronic apparatus 1000 may be implemented as a cellular phone, a video phone, a smart pad, a smart watch, a tablet PC, a car navigation system, a computer monitor, a laptop, a head mounted display (HMD) device, or the like.

The processor 1010 may perform various computing functions or various tasks. The processor 1010 may be at least one processor, with some of the at least one processor, separately or in combination, being configured to perform one or more operations. The processor 1010 may be a micro-processor, a central processing unit (CPU), an application processor (AP), and the like. The processor 1010 may be coupled or connected to other components via an address bus, a control bus, a data bus, etc. Further, the processor 1010 may be coupled or connected to an extended bus such as a peripheral component interconnection (PCI) bus.

The processor 1010 may output the input image data IMG and the input control signal CONT to the driving controller 200 of FIG. 1.

The memory device 1020 may store data for operations of the electronic apparatus 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, or the like and/or at least one volatile memory device such as a dynamic random access memory (DRAM) device, a static random access memory (SRAM) device, a mobile DRAM device, or the like.

The storage device 1030 may include, e.g., a solid state drive (SSD) device, a hard disk drive (HDD) device, a CD-ROM device, or the like. The I/O device 1040 may include an input device such as a keyboard, a keypad, a mouse device, a touch-pad, a touch-screen, or the like and an output device such as a printer, a speaker, or the like. In some embodiments, the display apparatus 1060 may be included in the I/O device 1040. The power supply 1050 may provide power for operations of the electronic apparatus 1000. The display apparatus 1060 may be coupled or connected to other components via the buses or other communication links.

Figure 26:
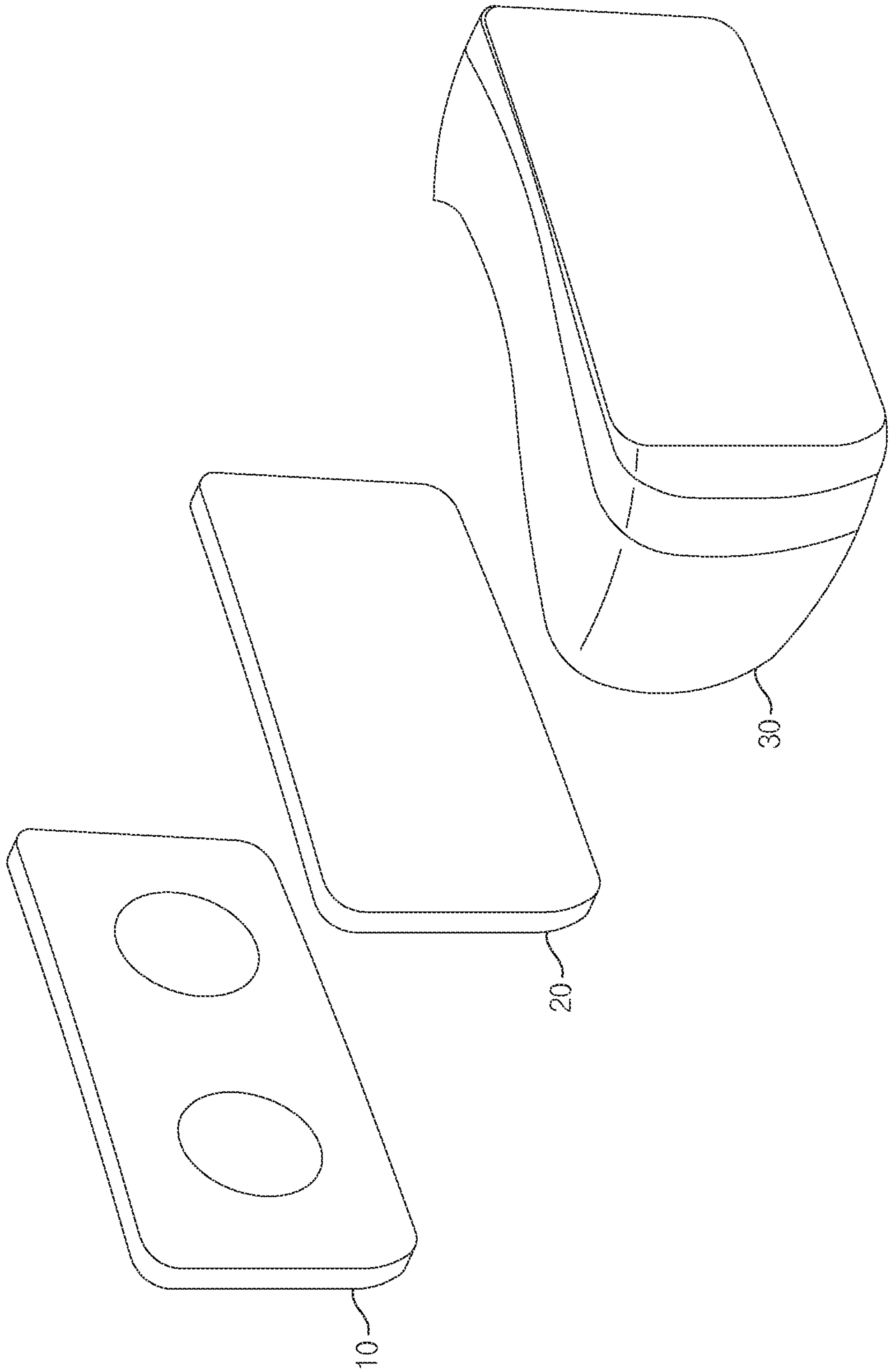
FIG. 26 is a schematic diagram illustrating an example in which the electronic apparatus of FIG. 24 is implemented as a virtual reality display system.

FIG. 26 is a schematic diagram illustrating an example in which the electronic apparatus of FIG. 24 is implemented as a virtual reality display system.

Referring to FIGS. 24 and 26, the virtual reality display system may include a lens unit 10, a display apparatus 20, and/or a housing 30. The display apparatus 20 may be disposed adjacent to the lens unit 10. The housing 30 may receive the lens unit 10 and the display apparatus 20. FIG. 26 illustrates that the lens unit 10 and the display apparatus 20 are received in a first side of the housing 30 in FIG. 26, but the disclosure may not be limited thereto. As another example, the lens unit 10 may be received in the first side of the housing 30, and the display apparatus 20 may be received in a second side of the housing 30 opposite to the first side of the housing 30. In case that the lens unit 10 and the display apparatus 20 are received in opposite sides of the housing 30, the housing 30 may have a transmission area to transmit light.

For example, the virtual reality display system may be a head mounted display system which is wearable on a head of a user. Although not shown in the drawings, the virtual reality display system may further include a head band to fix the virtual reality display system on the head of the user.

As another example, the virtual reality display system may be smart glasses having a shape of glasses.

The electronic apparatus may be implemented as an augmented reality display system.

Figure 27:
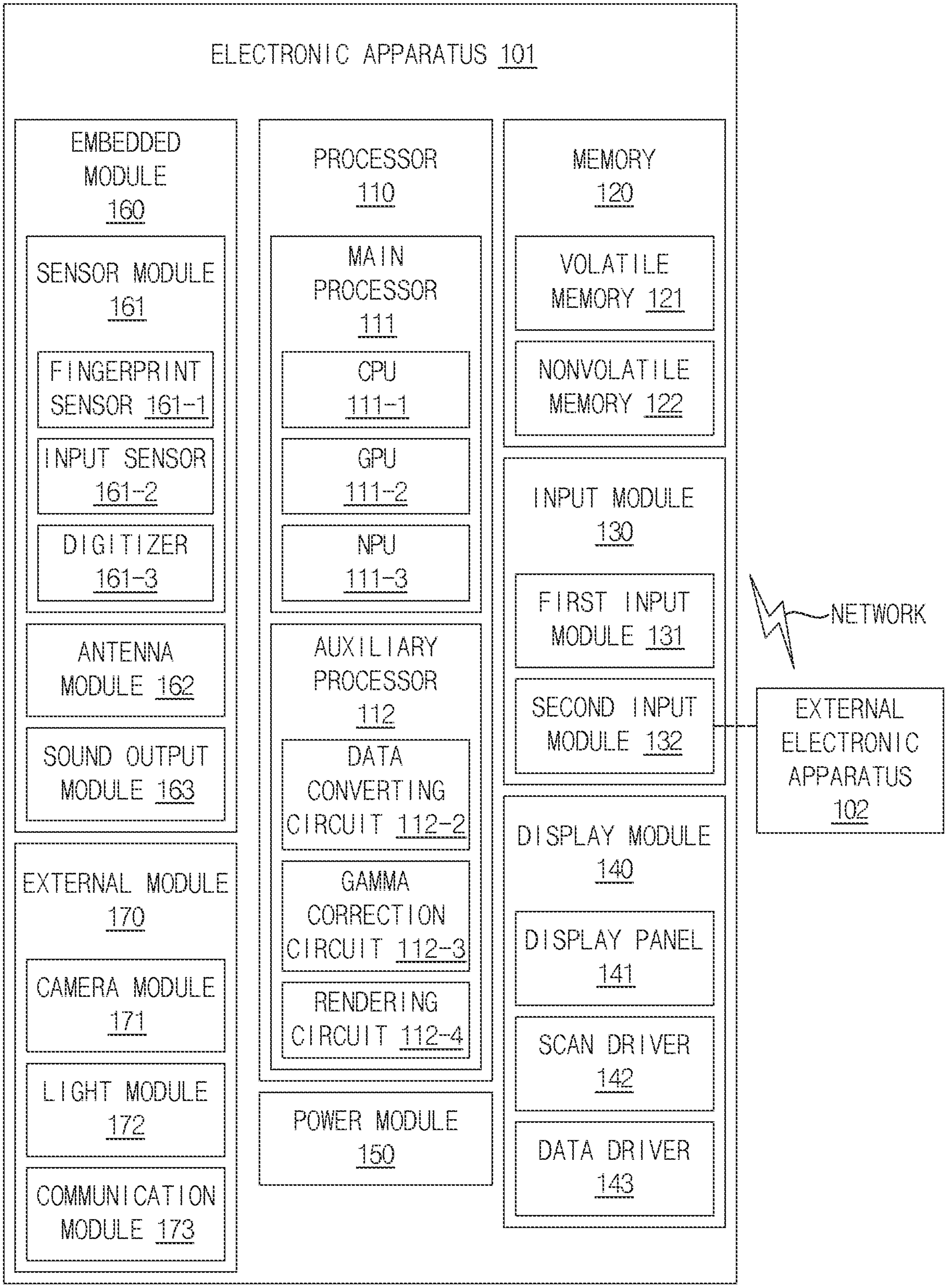
FIG. 27 is a schematic block diagram illustrating an electronic apparatus according to an embodiment of the present disclosure.

FIG. 27 is a schematic block diagram illustrating an electronic apparatus 101 according to an embodiment of the disclosure.

Referring to FIGS. 1 to 27, an electronic apparatus 101 may output various information through a display module 140 in an operating system. In case that a processor 110 executes an application stored in a memory 120, the display module 140 may provide application information to a user through a display panel 141.

The processor 110 may obtain an external input through an input module 130 or a sensor module 161 and may execute an application corresponding to the external input. For example, in case that the user selects a camera icon displayed on the display panel 141, the processor 110 may obtain a user input through an input sensor 161-2 and may activate a camera module 171. The processor 110 may transfer image data corresponding to a captured image obtained through the camera module 171 to the display module 140. The display module 140 may display an image corresponding to the captured image through the display panel 141.

In an embodiment, in case that a personal information authentication is executed in the display module 140, a fingerprint sensor 161-1 may obtain input fingerprint information as input data. The processor 110 may compare input data obtained through the fingerprint sensor 161-1 with authentication data stored in the memory 120, and may execute an application according to a comparison result. The display module 140 may display information executed according to application logic through the display panel 141.

In an embodiment, in case that a music streaming icon displayed on the display module 140 is selected, the processor 110 may obtain a user input through the input sensor 161-2 and may activate a music streaming application stored in the memory 120. In case that a music execution command is input in the music streaming application, the processor 110 may activate a sound output module 163 to provide sound information corresponding to the music execution command to the user.

In the above, the operation of the electronic apparatus 101 is briefly described. Hereinafter, a configuration of the electronic apparatus 101 is described in detail. Some of elements of the electronic apparatus 101 described below may be integrated and provided as an element, or an element may be separated into two or more elements.

The electronic apparatus 101 may communicate with an external electronic apparatus 102 through a network (e.g., a short-range wireless communication network or a long-range wireless communication network). According to an embodiment, the electronic apparatus 101 may include the processor 110, the memory 120, the input module 130, the display module 140, a power module 150, an embedded module 160, and/or an external module 170. According to an embodiment, in the electronic apparatus 101, at least one of the above-described elements may be omitted, or one or more other elements may be added. According to an embodiment, some of the above-described elements (e.g., the sensor module 161, an antenna module 162, or the sound output module 163) may be integrated into another element (e.g., the display module 140).

The processor 110 may execute software to control at least one other element (e.g., a hardware or software element) of the electronic apparatus 101 connected to the processor 110 and to perform various data processing or operations. According to an embodiment, the processor 110 may store instructions or data, as at least part of the data processing or the operations, received from other elements (e.g., the input module 130, the sensor module 161, or a communication module 173) in a volatile memory 121, may process the instructions or data stored in the volatile memory 121, and may store result data of the processing in a nonvolatile memory 122.

The processor 110 may include a main processor 111 and an auxiliary processor 112. The main processor 111 may include at least one of a central processing unit (CPU) 111-1 and an application processor (AP). The main processor 111 may further include one or more of a graphic processing unit (GPU) 111-2, a communication processor (CP), and an image signal processor (ISP). The main processor 111 may further include a neural network processing unit (NPU) 111-3. The neural network processing unit 111-3 may be a processor specialized in processing an artificial intelligence model. The artificial intelligence model may be generated through a machine learning. The artificial intelligence model may include artificial neural network layers. The artificial neural network may be at least one of a deep neural network (DNN), a convolutional neural network (CNN), a recurrent neural network (RNN), a restricted Boltzmann machine (RBM), a deep belief network (DBN), a bidirectional recurrent deep neural network (BRDNN), and a deep Q-networks or a combination of two or more of the above. However, the artificial neural network is not limited to the above examples. The artificial intelligence model may include software structures, in addition to hardware structures or instead of the hardware structures. At least two of the above-described processing units and the above-described processors may be implemented as an integrated element (e.g., a single chip), or each may be implemented as independent elements (e.g., in multiple chips).

The auxiliary processor 112 may include a controller. The controller may include an interface conversion circuit and a timing control circuit. The controller may receive an image signal from the main processor 111, may convert a data format of the image signal to meet interface specifications with the display module 140, and may output image data. The controller may output various control signals for driving the display module 140.

The auxiliary processor 112 may further include a data converting circuit 112-2, a gamma correction circuit 112-3, and a rendering circuit 112-4. The data converting circuit 112-2 may receive the image data from the controller and may compensate the image data such that the image is displayed with a desired luminance according to characteristics of the electronic apparatus 101 or a user setting or may convert the image data to reduce power consumption or compensate for afterimages. The gamma correction circuit 112-3 may convert the image data or a gamma reference voltage such that the image displayed on the electronic apparatus 101 has desired gamma characteristics. The rendering circuit 112-4 may receive the image data from the controller and may render the image data based on a pixel arrangement of the display panel 141 included in the electronic apparatus 101. At least one of the data converting circuit 112-2, the gamma correction circuit 112-3, and the rendering circuit 112-4 may be integrated into another element (e.g., the main processor 111 or the controller). At least one of the data converting circuit 112-2, the gamma correction circuit 112-3, and the rendering circuit 112-4 may be integrated into a data driver 143 to be described below.

The memory 120 may store various data used by at least one element (e.g., the processor 110 or the sensor module 161) of the electronic apparatus 101 and input data or output data for commands related thereto. The memory 120 may include at least one of the volatile memory 121 and the nonvolatile memory 122.

The input module 130 may receive commands or data used to the elements (e.g., the processor 110, the sensor module 161, or the sound output module 163) of the electronic apparatus 101 from the outside of the electronic apparatus 101 (e.g., the user or the external electronic apparatus 102).

The input module 130 may include a first input module 131 for receiving commands or data from the user and a second input module 132 for receiving commands or data from the external electronic apparatus 102. The first input module 131 may include a microphone, a mouse, a keyboard, a key (e.g., a button), or a pen (e.g., a passive pen or an active pen). The second input module 132 may support a designated protocol capable of connecting to the external electronic apparatus 102 by wire or wireless. According to an embodiment, the second input module 132 may include a high definition multimedia interface (HDMI), a universal serial bus (USB) interface, an SD card interface, or an audio interface. The second input module 132 may include a connector physically connected to the external electronic apparatus 102, for example, an HDMI connector, a USB connector, an SD card connector, or an audio connector (e.g., a headphone connector).

The display module 140 may visually provide information to the user. The display module 140 may include the display panel 141, a scan driver 142, and/or the data driver 143. The display module 140 may further include a window, a chassis, and/or a bracket to protect the display panel 141.

The display panel 141 may include a liquid crystal display panel, an organic light emitting display panel, or an inorganic light emitting display panel. A type of the display panel 141 is not particularly limited. The display panel 141 may be a rigid type display panel or a flexible type display panel capable of being rolled or folded. The display module 140 may further include a supporter or a heat dissipation member supporting the display panel 141.

The scan driver 142 may be mounted on the display panel 141 as a driving chip. As another example, the scan driver 142 may be integrated into the display panel 141. For example, the scan driver 142 may include an amorphous silicon TFT gate driver circuit (ASG) integrated into the display panel 141, a low temperature polycrystalline silicon (LTPS) TFT gate driver circuit integrated into the display panel 141, and/or an oxide semiconductor TFT gate driver circuit (OSG) integrated into the display panel 141. The scan driver 142 may receive a control signal from the controller and may output the scan signals to the display panel 141 in response to the control signal.

The display module 140 may further include a light emission driver. The light emission driver may output a light emission control signal to the display panel 141 in response to a control signal received from the controller. The light emission driver may be formed independently from the scan driver 142. As another example, the light emission driver and the scan driver 142 may be integrally formed.

The data driver 143 may receive a control signal from the controller, may convert the image data into an analog voltage (e.g., the data voltage) and may output the data voltages to the display panel 141 in response to the control signal.

The data driver 143 may be integrated into another element (e.g., the controller). The functions of the interface conversion circuit and the timing control circuit of the controller described above may be integrated into the data driver 143.

The display module 140 may further include a voltage generating circuit. The voltage generating circuit may output various voltages for driving the display panel 141.

The power module 150 may supply power to elements of the electronic apparatus 101. The power module 150 may include a battery which supplies a power voltage. The battery may include a non-rechargeable primary cell, a rechargeable secondary cell, or a fuel cell. The power module 150 may include a power management integrated circuit (PMIC). The PMIC may supply optimized power to each of the above-described modules and modules described below. The power module 150 may include a wireless power transmission/reception member electrically connected to the battery. The wireless power transmission/reception member may include antenna radiators in a form of coils.

The electronic apparatus 101 may further include the embedded module 160 and/or the external module 170. The embedded module 160 may include the sensor module 161, the antenna module 162, and/or the sound output module 163. The external module 170 may include the camera module 171, a light module 172, and/or the communication module 173.

The sensor module 161 may detect an input by a user's body or an input by the pen of the first input module 131, and may generate an electrical signal or a data value corresponding to the input. The sensor module 161 may include at least one of the fingerprint sensor 161-1, the input sensor 161-2, and a digitizer 161-3.

The fingerprint sensor 161-1 may generate a data value corresponding to a user's fingerprint. The fingerprint sensor 161-1 may include one of an optical fingerprint sensor or a capacitive fingerprint sensor.

The input sensor 161-2 may generate data values corresponding to coordinate information of the input by the user's body or the input by the pen. The input sensor 161-2 may generate a capacitance change due to an input as a data value. The input sensor 161-2 may detect an input by a passive pen or transmit/receive data to/from the active pen.

The input sensor 161-2 may measure bio signals such as a blood pressure, a moisture, or a body fat. For example, in case that a user brings a part of his or her body into contact with a sensor layer or a sensing panel and does not move for a certain period of time, the input sensor 161-2 may detect the bio signal based on a change in an electric field caused by the part of the body so that the display module 140 may output the user's desired information.

The digitizer 161-3 may generate a data value corresponding to the coordinate information input by the pen. The digitizer 161-3 may generate an amount of electromagnetic change due to the input as a data value. The digitizer 161-3 may detect an input by the passive pen or transmit/receive data to/from the active pen.

At least one of the fingerprint sensor 161-1, the input sensor 161-2, and the digitizer 161-3 may be formed as a sensor layer on the display panel 141 through a continuous process. The fingerprint sensor 161-1, the input sensor 161-2, and the digitizer 161-3 may be disposed on the display panel 141. At least one of the fingerprint sensor 161-1, the input sensor 161-2, and the digitizer 161-3, for example, the digitizer 161-3, may be disposed under the display panel 141.

At least two or more of the fingerprint sensor 161-1, the input sensor 161-2, and the digitizer 161-3 may be integrated into a sensing panel through the same process. In case that the at least two or more of the fingerprint sensor 161-1, the input sensor 161-2, and the digitizer 161-3 are integrated into the sensing panel, the sensing panel may be disposed between the display panel 141 and a window disposed over an upper side of the display panel 141. According to an embodiment, the sensing panel may be disposed on the window. However, the disclosure may not be limited to a position of the sensing panel.

At least one of the fingerprint sensor 161-1, the input sensor 161-2, and the digitizer 161-3 may be embedded in the display panel 141. For example, at least one of the fingerprint sensor 161-1, the input sensor 161-2, and the digitizer 161-3 may be formed simultaneously with the display panel 141 through a process of forming elements included in the display panel 141 (e.g., light emitting elements, transistors, etc.).

The sensor module 161 may generate an electrical signal or a data value corresponding to an internal state or an external state of the electronic apparatus 101. For example, the sensor module 161 may further include a gesture sensor, a gyro sensor, a barometric pressure sensor, a magnetic sensor, an acceleration sensor, a grip sensor, a proximity sensor, a color sensor, an IR (infrared) sensor, a biosensor, a temperature sensor, a humidity sensor, or an illuminance sensor.

The antenna module 162 may include one or more antennas for transmitting a signal or power to the outside or receiving a signal or power from the outside. According to an embodiment, the communication module 173 may transmit a signal to an external electronic apparatus or receive a signal from an external electronic apparatus through an antenna suitable for a communication method. An antenna pattern of the antenna module 162 may be integrated into an element of the display module 140 (e.g., the display panel 141) or the input sensor 161-2.

The sound output module 163 may be a device for outputting sound signals to the outside of the electronic apparatus 101. For example, the sound output module 163 may include a speaker used for general purposes such as playing multimedia or recording and a receiver used exclusively for receiving a call. According to an embodiment, the receiver may be integral with or separately from the speaker. A sound output pattern of the sound output module 163 may be integrated into the display module 140.

The camera module 171 may capture still images and moving images. According to an embodiment, the camera module 171 may include one or more lenses, an image sensor, or an image signal processor. The camera module 171 may further include an infrared camera capable of determining presence or absence of a user, the user's location, and the user's gaze.

The light module 172 may provide light. The light module 172 may include a light emitting diode and/or a xenon lamp. The light module 172 may operate in conjunction with the camera module 171 or operate independently.

The communication module 173 may support establishment of a wired or wireless communication channel between the electronic apparatus 101 and the external electronic apparatus 102 and communication through the established communication channel. The communication module 173 may include one or all of a wireless communication module such as a cellular communication module, a short-distance wireless communication module, or a global navigation satellite system (GNSS) communication module and a wired communication module such as a local area network (LAN) communication module or a power line communication module. The communication module 173 may communicate with the external electronic apparatus 102, e.g., through a short-range communication network such as Bluetooth, Wi-Fi direct, or infrared data association (IrDA) or a long-distance communication network such as a cellular network, the Internet, or a computer network (e.g., a LAN or WAN). The various types of communication modules 173 described above may be implemented as a single chip or may be implemented as separate chips.

The input module 130, the sensor module 161, and the camera module 171 may be used to control the operation of the display module 140 in conjunction with the processor 110.

The processor 110 may output commands or data to the display module 140, the sound output module 163, the camera module 171, or the light module 172 based on the input data received from the input module 130. For example, the processor 110 may generate image data corresponding to input data applied through a mouse or an active pen and may output the generated image data to the display module 140, or the processor 110 may generate command data corresponding to the input data and may output the generated command data to the camera module 171 or the light module 172. In case that input data is not received from the input module 130 for a certain period of time, the processor 110 may convert an operation mode of the electronic apparatus 101 into a low power mode or a sleep mode so that power consumption of the electronic apparatus 101 may be reduced.

The processor 110 may output commands or data to the display module 140, the sound output module 163, the camera module 171, or the light module 172 based on sensed data received from the sensor module 161. For example, the processor 110 may compare authentication data applied by the fingerprint sensor 161-1 with authentication data stored in the memory 120, and may execute an application according to the comparison result. The processor 110 may execute commands or output corresponding image data to the display module 140 based on the sensed data sensed by the input sensor 161-2 or the digitizer 161-3. In case that the sensor module 161 includes a temperature sensor, the processor 110 may receive temperature data for the temperature measured by the sensor module 161 and may further perform luminance correction on the image data based on the temperature data.

The processor 110 may receive determined data about the presence or absence of the user, the user's location, and the user's gaze from the camera module 171. The processor 110 may further perform luminance correction on the image data based on the determined data. For example, the processor 110, which determines presence or absence of the user through an input from the camera module 171, may display image data having the luminance corrected by the data converting circuit 112-2 or the gamma correction circuit 112-3 to the display module 140.

Some of the above elements may be connected to each other through a communication method between peripheral devices such as a bus, a general purpose input/output (GPIO), a serial peripheral interface (SPI), a mobile industry processor interface (MIPI), or an ultra path interconnect (UPI) link to exchange signals (e.g., commands or data) with each other. The processor 110 may communicate with the display module 140 through an agreed interface. For example, the processor 110 may communicate with the display module 140 through any one of the above communication methods. However, the disclosure may not be limited to the above communication methods.

The electronic apparatus 101 according to various embodiments disclosed in the disclosure may be various types of apparatuses. For example, the electronic apparatus 101 may include at least one of a portable communication apparatus (e.g., a smart phone), a computer apparatus, a portable multimedia apparatus, a portable medical apparatus, a camera, a wearable device, and a home appliance. The electronic apparatus 101 according to the embodiment of the disclosure may not be limited to the aforementioned apparatuses.

For example, the display panel 100 of FIG. 1 may correspond to the display panel 141 of FIG. 27. For example, the driving controller 200 of FIG. 1 may correspond to the controller of the auxiliary processor 112 of FIG. 27. For example, the gate driver 300 of FIG. 1 may correspond to the scan driver 142 of FIG. 27. For example, the data driver 500 of FIG. 1 may correspond to the data driver 143 of FIG. 27.

According to the pixel circuit and the display apparatus of the disclosure as explained above, the ultra-high resolution display apparatus may be implemented using the pixel circuit having high integration.

The foregoing is illustrative of the disclosure and is not to be construed as limiting thereof. Although a few embodiments of the disclosure have been described, those skilled in the art will readily appreciate that many modifications are possible in the embodiments without materially departing from the novel teachings and advantages of the disclosure. Accordingly, all such modifications are intended to be included within the scope of the disclosure and as defined in the claims. In the claims, means-plus-function clauses are intended to cover the structures described herein as performing the recited function and not only structural equivalents but also equivalent structures. Therefore, it is to be understood that the foregoing is illustrative of the disclosure and is not to be construed as limited to the specific embodiments disclosed, and that modifications to the disclosed embodiments, as well as other embodiments, are intended to be included within the scope of the appended claims. The claimed invention is defined by the following claims, with equivalents of the claims to be included therein.

What is claimed is:

1. A pixel circuit comprising:

a first transistor including a control electrode electrically connected to a gate node, a first electrode that receives a first power voltage, and a second electrode electrically connected to a second node;

a second transistor including a control electrode that receives a data writing gate signal, a first electrode that receives a data voltage, and a second electrode electrically connected to a first node;

a third transistor including a control electrode that receives a compensation gate signal, a first electrode electrically connected to the gate node, and a second electrode electrically connected to the second node;

a fourth transistor including a control electrode that receives an initialization gate signal, a first electrode that receives an initialization voltage, and a second electrode directly and electrically connected to the gate node;

a fifth transistor including a control electrode that receives the initialization gate signal, a first electrode directly and electrically connected to the first node, and a second electrode electrically connected to an anode node;

a sixth transistor including a control electrode that receives an emission signal, a first electrode electrically connected to the second node, and a second electrode electrically connected to the anode node; and a light emitting element including a first electrode electrically connected to the anode node, and a second electrode that receives a second power voltage.

2. The pixel circuit of claim 1, further comprising:

a first capacitor including a first end that receives the first power voltage, and a second end electrically connected to the gate node; and a second capacitor including a first end electrically connected to the first node, and a second end electrically connected to the gate node.

3. The pixel circuit of claim 1, wherein in a first period, the emission signal has an active level, the initialization gate signal has an active level, the compensation gate signal has an active level, and the data writing gate signal has an inactive level.

4. The pixel circuit of claim 3, wherein in a second period subsequent to the first period, the emission signal has the inactive level, the initialization gate signal has an inactive level, the compensation gate signal has the active level, and the data writing gate signal has the inactive level.

5. The pixel circuit of claim 4, wherein in a third period subsequent to the second period, the emission signal has the inactive level, the initialization gate signal has the inactive level, the compensation gate signal has an inactive level, and the data writing gate signal has an active level.

6. The pixel circuit of claim 5, wherein in a fourth period subsequent to the third period, the emission signal has the active level, the initialization gate signal has the inactive level, the compensation gate signal has the inactive level, and the data writing gate signal has the inactive level.

7. The pixel circuit of claim 1, wherein in a first period, the emission signal has an inactive level, the data writing gate signal has an active level, the initialization gate signal has an active level, and the compensation gate signal has an inactive level.

8. The pixel circuit of claim 7, wherein in a second period subsequent to the first period, the emission signal has the inactive level, the data writing gate signal has the active level, the initialization gate signal has an inactive level, and the compensation gate signal has an active level.

9. The pixel circuit of claim 8, wherein in a third period subsequent to the second period, the emission signal has the inactive level, the data writing gate signal has the active level, the initialization gate signal has the inactive level, and the compensation gate signal has the inactive level.

10. The pixel circuit of claim 9, wherein in a fourth period subsequent to the third period, the emission signal has an active level, the data writing gate signal has an inactive level, the initialization gate signal has the inactive level, and the compensation gate signal has the inactive level.

11. The pixel circuit of claim 1, wherein the compensation gate signal of an n-th stage is the initialization gate signal of an (n+1)-th stage, where n is a positive integer.

12. The pixel circuit of claim 1, wherein in a first period, the emission signal has an active level, the data writing gate signal has an active level, the initialization gate signal has an active level, and the compensation gate signal has an active level.

13. The pixel circuit of claim 12, wherein in a second period subsequent to the first period, the emission signal has an inactive level, the data writing gate signal has the active level, the initialization gate signal has an inactive level, and the compensation gate signal has the active level.

14. The pixel circuit of claim 13, wherein in a third period subsequent to the second period, the emission signal has the inactive level, the data writing gate signal has the active level, the initialization gate signal has the inactive level, and the compensation gate signal has an inactive level.

15. The pixel circuit of claim 14, wherein in a fourth period subsequent to the third period, the emission signal has the active level, the data writing gate signal has an inactive level, the initialization gate signal has the inactive level, and the compensation gate signal has the inactive level.

16. A display apparatus comprising:

a display panel including a pixel circuit;

a gate driver configured to output a gate signal to the pixel circuit;

a data driver configured to output a data voltage to the pixel circuit; and an emission driver configured to output an emission signal to the pixel circuit, wherein the pixel circuit comprises:

a first transistor including a control electrode electrically connected to a gate node, a first electrode that receives a first power voltage, and a second electrode electrically connected to a second node;

a second transistor including a control electrode that receives a data writing gate signal, a first electrode that receives a data voltage, and a second electrode electrically connected to a first node;

a third transistor including a control electrode that receives a compensation gate signal, a first electrode electrically connected to the gate node, and a second electrode electrically connected to the second node;

a fourth transistor including a control electrode that receives an initialization gate signal, a first electrode that receives an initialization voltage, and a second electrode directly and electrically connected to the gate node;

a fifth transistor including a control electrode that receives the initialization gate signal, a first electrode directly and electrically connected to the first node, and a second electrode electrically connected to an anode node;

a sixth transistor including a control electrode that receives the emission signal, a first electrode electrically connected to the second node, and a second electrode electrically connected to the anode node; and a light emitting element including a first electrode electrically connected to the anode node, and a second electrode that receives a second power voltage.

17. The display apparatus of claim 16, wherein the pixel circuit further comprises:

a first capacitor including a first end that receives the first power voltage, and a second end electrically connected to the gate node; and a second capacitor including a first end electrically connected to the first node, and a second end electrically connected to the gate node.

18. A display apparatus comprising:

a display panel including a pixel circuit;

a gate driver configured to output a gate signal to the pixel circuit;

a data driver configured to output a data voltage to the pixel circuit; and an emission driver configured to output an emission signal to the pixel circuit, wherein the pixel circuit comprises:

a first transistor including a control electrode electrically connected to a gate node, a first electrode that receives a first power voltage, and a second electrode electrically connected to a second node;

a second transistor including a control electrode that receives a data writing gate signal, a first electrode that receives a data voltage, and a second electrode electrically connected to a first node;

a third transistor including a control electrode that receives a compensation gate signal, a first electrode electrically connected to the gate node, and a second electrode electrically connected to the second node;

a fourth transistor including a control electrode that receives an initialization gate signal, a first electrode that receives an initialization voltage, and a second electrode electrically connected to the gate node;

a fifth transistor including a control electrode that receives the initialization gate signal, a first electrode electrically connected to the first node, and a second electrode electrically connected to an anode node;

a sixth transistor including a control electrode that receives the emission signal, a first electrode electrically connected to the second node, and a second electrode electrically connected to the anode node; and a light emitting element including a first electrode electrically connected to the anode node, and a second electrode that receives a second power voltage, wherein in a first period, the emission signal has an active level, the initialization gate signal has an active level, the compensation gate signal has an active level, and the data writing gate signal has an inactive level.

19. The display apparatus of claim 18, wherein in a second period subsequent to the first period, the emission signal has the inactive level, the initialization gate signal has an inactive level, the compensation gate signal has the active level, and the data writing gate signal has the inactive level.

20. The display apparatus of claim 19, wherein in a third period subsequent to the second period, the emission signal has the inactive level, the initialization gate signal has the inactive level, the compensation gate signal has an inactive level, and the data writing gate signal has an active level.

21. The display apparatus of claim 20, wherein in a fourth period subsequent to the third period, the emission signal has the active level, the initialization gate signal has the inactive level, the compensation gate signal has the inactive level, and the data writing gate signal has the inactive level.

22. The display apparatus of claim 16, wherein the compensation gate signal of an n-th stage is the initialization gate signal of an (n+1)-th stage, where n is a positive integer.

* * * * *